(12) United States Patent
Isoyama et al.

(10) Patent No.: US 7,227,860 B2
(45) Date of Patent: Jun. 5, 2007

(54) PACKET SWITCH AND METHOD OF SCHEDULING THE SAME

(75) Inventors: Kazuhiko Isoyama, Tokyo (JP); Masahiko Honda, Tokyo (JP)

(73) Assignee: NEC Corporation, Tokyo (JP)

( * ) Notice: Subject to any disclaimer, the term of this patent is extended or adjusted under 35 U.S.C. 154(b) by 751 days.

(21) Appl. No.: 09/795,191

(22) Filed: Mar. 1, 2001

(65) Prior Publication Data
US 2001/0021191 A1 Sep. 13, 2001

(30) Foreign Application Priority Data
Mar. 1, 2000 (JP) .............................. 2000-055249

(51) Int. Cl.
*H04L 12/50* (2006.01)
(52) U.S. Cl. ...................................... 370/386; 370/360
(58) Field of Classification Search ................ 370/360, 370/359, 386, 389, 392
See application file for complete search history.

(56) References Cited

U.S. PATENT DOCUMENTS

| | | | | |
|---|---|---|---|---|
| 5,091,940 A | * | 2/1992 | Clebowicz | 380/37 |
| 5,327,552 A | * | 7/1994 | Liew | 714/4 |
| 5,517,495 A | * | 5/1996 | Lund et al. | 370/399 |
| 5,734,649 A | * | 3/1998 | Carvey et al. | 370/355 |
| 6,223,242 B1 | * | 4/2001 | Sheafor et al. | 710/317 |
| 6,370,148 B1 | * | 4/2002 | Calvignac et al. | 370/412 |
| 6,473,428 B1 | * | 10/2002 | Nichols et al. | 370/395.1 |
| 6,654,343 B1 | * | 11/2003 | Brandis et al. | 370/229 |
| 6,693,909 B1 | * | 2/2004 | Mo et al. | 370/392 |
| 6,731,636 B1 | * | 5/2004 | Ikematsu | 370/395.1 |
| 6,735,212 B1 | * | 5/2004 | Calamvokis | 370/412 |
| 6,754,223 B1 | * | 6/2004 | Lussier et al. | 370/412 |

FOREIGN PATENT DOCUMENTS

| | | |
|---|---|---|
| JP | 5-292116 | 11/1993 |
| JP | 9-168016 | 6/1997 |
| JP | 9-321768 | 12/1997 |
| JP | H09-321768 | 12/1997 |
| JP | 2967767 | 8/1999 |
| JP | 11-331203 | 11/1999 |
| JP | H11331203 | 11/1999 |
| JP | 2001-111557 | 4/2001 |

* cited by examiner

*Primary Examiner*—Chau Nguyen
*Assistant Examiner*—Steve Blount
(74) *Attorney, Agent, or Firm*—Sughrue Mion, PLLC

(57) ABSTRACT

A packet switch includes (a) a plurality of inputs into each of which a packet is input, (b) a switch which receives the packet from the input and switches an output through which the packet is transmitted, and (c) a scheduler which controls the switch. The scheduler (103) includes (c1) a shuffler (201) which shuffles an order of precedence in a first request transmitted from the input to transfer the packet, (c2) a schedule algorithm (202) which determines the output, based on the first request having the order of precedence having been shuffled by the shuffler, and produces a second request to transfer a packet which second request is associated with the first request having the order of precedence having been shuffled by the shuffler, and (c3) a re-shuffler (203) which turns an order of precedence of the second request to be identical with the order of precedence in the first request as found before having been shuffled by the shuffler, and returns the thus turned order of precedence back to the input.

18 Claims, 15 Drawing Sheets

FIG. 8

| SLOT | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|---|
| CYCLING DEGREE | 1ST STAGE | 0 | | | | | | | | | | | | 1 | | | | | | | | | | | |
| | 2ND STAGE | 0 | | | | 1 | | | | 2 | | | | 0 | | | | 1 | | | | 2 | | | |
| | 3RD STAGE | 0 | 1 | 2 | 3 | 0 | 1 | 2 | 3 | 0 | 1 | 2 | 3 | 0 | 1 | 2 | 3 | 0 | 1 | 2 | 3 | 0 | 1 | 2 | 3 |
| ORDER OF PRECEDENCE (FIRST STAGE) | PORT 1 | 1 | | | | | | | | | | | | 1 | | | | | | | | | | | |
| | PORT 2 | 2 | | | | | | | | | | | | 2 | | | | | | | | | | | |
| | PORT 3 | 3 | | | | | | | | | | | | 3 | | | | | | | | | | | |
| | PORT 4 | 4 | | | | | | | | | | | | 4 | | | | | | | | | | | |
| ORDER OF PRECEDENCE (SECOND STAGE) | PORT 1 | 1 | | | | 1 | | | | 1 | | | | 1 | | | | 1 | | | | 1 | | | |
| | PORT 2 | 2 | | | | 3 | | | | 4 | | | | 2 | | | | 3 | | | | 4 | | | |
| | PORT 3 | 3 | | | | 4 | | | | 2 | | | | 3 | | | | 4 | | | | 2 | | | |
| | PORT 4 | 4 | | | | 2 | | | | 3 | | | | 4 | | | | 2 | | | | 3 | | | |
| ORDER OF PRECEDENCE (THIRD STAGE) | PORT 1 | 1 | 2 | 3 | 4 | 1 | 3 | 4 | 2 | 1 | 4 | 2 | 3 | 1 | 2 | 3 | 4 | 1 | 3 | 4 | 2 | 1 | 4 | 2 | 3 |
| | PORT 2 | 2 | 3 | 4 | 1 | 3 | 4 | 2 | 1 | 4 | 2 | 3 | 1 | 2 | 3 | 4 | 1 | 3 | 4 | 2 | 1 | 4 | 2 | 3 | 1 |
| | PORT 3 | 3 | 4 | 1 | 2 | 4 | 2 | 1 | 3 | 2 | 3 | 1 | 4 | 3 | 4 | 1 | 2 | 4 | 2 | 1 | 3 | 2 | 3 | 1 | 4 |
| | PORT 4 | 4 | 1 | 2 | 3 | 2 | 1 | 3 | 4 | 3 | 1 | 4 | 2 | 4 | 1 | 2 | 3 | 2 | 1 | 3 | 4 | 3 | 1 | 4 | 2 |

FIG. 11

| SLOT | | 0 | 1 | 2 | 3 | 4 | 5 | 6 | 7 | 8 | 9 | 10 | 11 |
|---|---|---|---|---|---|---|---|---|---|---|---|---|---|
| CYCLING DEGREE | 1ST STAGE | 0 | 1 | 0 | 1 | 0 | 1 | 0 | 1 | 0 | 1 | 0 | 1 |
| | 2ND STAGE | 0 | 1 | 2 | 0 | 1 | 2 | 0 | 1 | 2 | 0 | 1 | 2 |
| | 3RD STAGE | 0 | 1 | 2 | 3 | 0 | 1 | 2 | 3 | 0 | 1 | 2 | 3 |
| ORDER OF PRECEDENCE (FIRST STAGE) | PORT 1 | 1 | 1 | 1 | 1 | 1 | 1 | 1 | 1 | 1 | 1 | 1 | 1 |
| | PORT 2 | 2 | 2 | 2 | 2 | 2 | 2 | 2 | 2 | 2 | 2 | 2 | 2 |
| | PORT 3 | 3 | 4 | 3 | 4 | 3 | 4 | 3 | 4 | 3 | 4 | 3 | 4 |
| | PORT 4 | 4 | 3 | 4 | 3 | 4 | 3 | 4 | 3 | 4 | 3 | 4 | 3 |
| ORDER OF PRECEDENCE (SECOND STAGE) | PORT 1 | 1 | 1 | 1 | 1 | 1 | 1 | 1 | 1 | 1 | 1 | 1 | 1 |
| | PORT 2 | 2 | 4 | 4 | 2 | 3 | 3 | 2 | 4 | 4 | 2 | 3 | 3 |
| | PORT 3 | 3 | 3 | 2 | 4 | 4 | 2 | 3 | 3 | 2 | 4 | 4 | 2 |
| | PORT 4 | 4 | 2 | 3 | 3 | 2 | 4 | 4 | 2 | 3 | 3 | 2 | 4 |
| ORDER OF PRECEDENCE (THIRD STAGE) | PORT 1 | 1 | 4 | 2 | 3 | 1 | 3 | 3 | 2 | 1 | 2 | 4 | 4 |
| | PORT 2 | 2 | 3 | 3 | 1 | 3 | 2 | 4 | 1 | 4 | 4 | 2 | 1 |
| | PORT 3 | 3 | 2 | 1 | 2 | 4 | 4 | 1 | 4 | 2 | 3 | 1 | 3 |
| | PORT 4 | 4 | 1 | 4 | 4 | 2 | 1 | 2 | 3 | 3 | 1 | 3 | 2 |

PACKET SWITCH AND METHOD OF SCHEDULING THE SAME

BACKGROUND OF THE INVENTION

1. Field of the Invention

The invention relates to a packet switch and a method of scheduling a packet switch, and more particularly to a packet switch and a method of scheduling a packet switch in both of which an order of precedence in a request to transfer a packet is shuffled.

2. Description of the Related Art

With recent remarkable development in Internet, core nodes constituting a network, such as a switch or a router, are required to have a high capacity to transfer a packet. As a switch used for transferring a packet, there are known a common buffer type switch, an output buffer type switch, and an input buffer type switch.

FIG. 1 is a block diagram of an example of a conventional common buffer type switch. The illustrated common buffer type switch is comprised of a multiplexer 1202, a common buffer 1204, a demultiplexer 1205, and a bus 1203 electrically connecting the multiplexer 1202, the common buffer 1204 and the demultiplexer 1205 to one another.

The multiplexer 1202 receives packets through a plurality of input ports $1201_1$ to $1201_n$, and transmits the received packets into the bus 1203. The packets transmitted into the bus 1203 are written into the common buffer 1204 in order. A controller (not illustrated) reads the packets out of the common buffer 1204 in accordance with a predetermined algorithm, and transmits the thus read-out packets into the bus 1203. The packets transmitted into the bus 1203 are supplied to the demultiplexer 1205. The demultiplexer 1205 demultiplexes the received packets in order, and outputs the thus multiplexed packet through one of a plurality of output ports $1206_1$ to $1206_n$. Thus, there is accomplished a function of switching a packet.

Since the common buffer type switch can include a large-sized common buffer, the common buffer type switch could have superior traffic characteristic.

However, since the common buffer 1204 is accessed by all the input ports $1201_1$ to $1201_n$ and all the output ports $1206_1$ to $1206_n$, it is required to increase a rate at which the packets are transferred through the bus 1203. However, since there is limitation in increasing such a rate, it would be quite difficult to accomplish a high-rate switch comprised of a common buffer type switch.

FIG. 2 is a block diagram of an example of a conventional output buffer type switch. The illustrated output buffer type switch is comprised of a switch 1302 and a plurality of output buffers $1304_1$ to $1304_n$ each of which receives an output signal transmitted from the switch 1302.

The switch 1302 receives packets through a plurality of input ports $1301_1$ to $1301_n$, switches the thus received packets, and outputs the thus switched packets to the output buffers $1304_1$ to $1304_n$. The output buffers $1304_1$ to $1304_n$ stores the received packets therein. The output buffers $1304_1$ to $1304_n$ transmit the packets stored therein through the output ports $1305_1$ to $1305_n$ in order.

If two or more packets are transmitted to one of the output ports $1206_1$ to $1206_n$, only one of the packets is output through the output port, and the rest of the packets are made wait.

In the output buffer type switch, the packets may be concurrently transmitted to a certain one output port from all the input ports. Accordingly, a rate at which a packet is transferred has to be equalized to X multiplied by n, wherein X indicates a transfer rate necessary for switching a single packet, and "n" means the number of the input or output ports. As a result, it would be quite difficult to accomplish a high-rate switch comprised of an output buffer type switch, similarly to the above-mentioned common buffer type switch.

Hence, there is predominantly used an input buffer type switch as a high-rate switch.

FIG. 3 is a block diagram of an example of a conventional input buffer type switch. The illustrated input buffer type switch is comprised of a plurality of input buffers $1402_1$ to $1402n$, a scheduler 1405, and a switch 1406.

The input buffers $1402_1$ to $1402n$ receive packets through input ports $1401_1$ to $1401n$, and stores the thus received packets therein. Then, the input buffers $1402_1$ to $1402n$ transmit requests $1404_1$ to $1404n$ to the scheduler 1405 in order to transfer the stored packets to an output port $1407_1$ to $1407n$ designated by address data.

The scheduler 1405 schedules the output ports $1407_1$ to $1407n$ to which the packets are to be transmitted, based on the requests $1404_1$ to $1404n$ transmitted from the input buffers $1402_1$ to $1402n$, and transmits results of scheduling the output ports $1407_1$ to $1407n$ to the switch 1406. On receipt of the results from the scheduler 1405, the switch outputs the packets through the designated output ports $1407_1$ to $1407n$.

In addition, the scheduler 1405 transmits grants indicative of an allowance to transfer a packet, to the input buffers $1402_1$ to $1402n$, based on the results of scheduling the output ports $1407_1$ to $1407n$.

On receipt of the grants from the scheduler 1405, the input buffers $1402_1$ to $1402n$ transfer the packets stored therein to the switch 1406. The switch 1406 switches the thus received packets, and transmits the packets to the output ports $1407_1$ to $1407n$. Thus, there is accomplished a function of switching a packet.

In the input buffer type switch, the scheduler 1405 schedules the output ports $1407_1$ to $1407n$ in accordance with a predetermined algorithm, based on the requests $1404_1$ to $1404n$ transmitted from the input buffers $1402_1$ to $1402n$. Accordingly, if the requests $1404_1$ to $1404n$ transmitted from the input buffers $1402_1$ to $1402n$ have the same order of precedence, a frequency of operating the switch 1406 becomes non-uniform among the input ports $1401_1$ to $1401n$.

Japanese Unexamined Patent Publication No. 5-292116 has suggested a control circuit for controlling an input buffer type ATM switch. The control circuit is comprised of means for reading addresses of a plurality of cells out of a header of FIFO memory, a table which manages transmission of cells from FIFO memory by every cell period, and means for transmitting a signal to request transmission of cells which signal includes addresses of cells, receiving response signals including a time at which a cell is to be output, reserving transmission of a cell from FIFO memory at a designated time at which a cell is to be output, with reference to the table, and outputting a cell from FIFO memory at the time. After a signal to request transmission of a cell has been transmitted, but before a cell is transmitted, a signal to request transmission of a next cell is transmitted. The suggested control circuit can receive packets from a high-rate input port, and absorb variance in both a process time in circuits and a delay time in signal transmission in circuits.

Japanese Unexamined Patent Publication No. 9-168016 has suggested a packet switch including an input buffer and an output buffer. The output buffer is designed to include a plurality of buffer areas shared by a plurality of output ports, and the input buffer is designed to include a logic queue associated with a combination of the buffer areas. An input controller inputs a multi-cast packet into a logic queue associated with a combination including a buffer area associated with an output port to which the multi-cast packet is addressed, and then, a scheduler and a switch transfer the multi-cast packet to a buffer area connected to the output port to which the multi-cast packet is addressed. Then, the multi-cast packet is transferred to the output port from the buffer area. Thus, it is possible to transfer multi-cast packets without an increase in packets to be transferred to the output buffer from the input buffer, and further without a problem of HOL blocking.

Japanese Patent No. 2967767 (Japanese Unexamined Patent Publication No. 11-68770) has suggested a scheduler used in ATM switch. The scheduler includes a cell selector which selects a cell to be output, based on a weight in each of classes and the number of accumulate queues. Specifically, the cell selector selects a class having a higher priority than others, with reference to predetermined priority of each of classes. That is, a higher priority is assigned to a traffic class required to have delay characteristic, and a class having a higher priority than others is selected in preference when an output queue is selected in rotational preference control. Thus, it would be possible to output a cell without waiting other cells having a lower priority being output. As a result, even if traffic classes to be accumulated were increased in number, it would be possible to reduce degradation in delay characteristic of a traffic class which is required to have real time characteristic, ensuring that CDV characteristic is avoided from being harmfully influenced.

SUMMARY OF THE INVENTION

In view of the above-mentioned problems in the conventional packet switches, it is an object of the present invention to provide a packet switch and a method of scheduling a packet switch both of which are capable of uniform switching across all input ports.

In one aspect of the present invention, there is provided a packet switch including (a) at least one input into which a packet is input, (b) a switch which receives the packet from the input and switches an output through which the packet is transmitted, and (c) a scheduler which controls the switch, the scheduler including (c1) a shuffler which shuffles an order of precedence in a first request transmitted from the input to transfer the packet, (c2) a schedule algorithm which determines the output, based on the first request having the order of precedence having been shuffled by the shuffler, and produces a second request to transfer a packet which second request is associated with the first request having the order of precedence having been shuffled by the shuffler, and (c3) a re-shuffler which turns an order of precedence of the second request to be identical with the order of precedence in the first request as found before having been shuffled by the shuffler, and returns the thus turned order of precedence back to the input.

The input may be designed to have N input port(s) wherein N is an integer equal to or greater than 1, in which case, it is preferable that the shuffler shuffles an order of precedence in N request(s) to transfer a packet, transmitted through the N input port(s), so as to define N! patterns of an order of precedence.

It is preferable that the shuffler includes a plurality of cyclic circuits in which a request to transfer a packet, transmitted through the N input ports, is initially set, in which case, a cyclic circuit or cyclic circuits other than a final stage cyclic circuit preferably cycles both (a) the initially set request, and (b) a request to transfer a packet, set by the previous stage cyclic circuit, in synchronization with a carry signal transmitted from the next stage cyclic circuit, and transmits the requests to the next stage cyclic circuit, and a final stage cyclic circuit preferably cycles both (a) the initially set request and (b) a request to transfer a packet, set by the previous stage cyclic circuit, in synchronization with a slot pulse generated in a predetermined cycle.

It is preferable that the re-shuffler includes a plurality of cyclic circuits in which a request to transfer a packet, transmitted from scheduling algorithm, is initially set, in which case, a first stage cyclic circuit preferably cycles the initially set request in synchronization with a slot pulse generated in a predetermined cycle, and a cyclic circuit or cyclic circuits other than the first stage cyclic circuit preferably cycles both (a) the initially set request, and (b) a request to transfer a packet, set by the previous stage cyclic circuit, in synchronization with a carry signal transmitted from the next stage cyclic circuit, and transmits the requests to the next stage cyclic circuit.

For instance, each of the cyclic circuits may be comprised of a ring shift register.

The input may be designed to have N input port(s) wherein N is an integer equal to or greater than 1, in which case, it is preferable that the shuffler shuffles an order of precedence in N request(s) to transfer a packet, transmitted through the N input port(s), so as to define M patterns of an order of precedence wherein M is a least common multiple of N, N−1, N−2, - - - , 3, 2.

It is preferable that the shuffler includes a plurality of cyclic circuits in which a request to transfer a packet, transmitted through the N input ports, is initially set, in which case, a cyclic circuit or cyclic circuits other than a final stage cyclic circuit preferably cycles both (a) the initially set request, and (b) a request to transfer a packet, set by the previous stage cyclic circuit, in synchronization with a slot pulse generated in a predetermined cycle, and transmits the requests to the next stage cyclic circuit, and a final stage cyclic circuit preferably cycles both (a) the initially set request and (b) a request to transfer a packet, set by the previous stage cyclic circuit, in synchronization with the slot pulse.

It is preferable that the re-shuffler includes a plurality of cyclic circuits in which a request to transfer a packet, transmitted from scheduling algorithm, is initially set, in which case, a first stage cyclic circuit preferably cycles the initially set request in synchronization with a slot pulse generated in a predetermined cycle, and a cyclic circuit or cyclic circuits other than the first stage cyclic circuit preferably cycles both (a) the initially set request, and (b) a request to transfer a packet, set by the previous stage cyclic circuit, in synchronization with the slot pulse, and transmits the requests to the next stage cyclic circuit.

The input may be designed to have N input port(s) wherein N is an integer equal to or greater than 1, in which case, the shuffler preferably shuffles an order of precedence in N request(s) to transfer a packet, transmitted through the N input port(s), so as to define first M patterns of an order of precedence, and then, further define second M patterns of an order of precedence, wherein M is a least common multiple of N, N−1, N−2, - - - , 3, 2.

It is preferable that the shuffler includes a plurality of cyclic circuits in which a request to transfer a packet, transmitted through the N input ports, is initially set, in which case, a cyclic circuit or cyclic circuits other than a final stage cyclic circuit preferably includes a gate circuit which is closed at a predetermined timing, and cycles both (a) the initially set request, and (b) a request to transfer a packet, set by the previous stage cyclic circuit, in synchronization with a slot pulse transmitted through the gate circuit in a predetermined cycle, and transmits the requests to the next stage cyclic circuit, and a final stage cyclic circuit preferably cycles both (a) the initially set request and (b) a request to transfer a packet, set by the previous stage cyclic circuit, in synchronization with the slot pulse.

It is preferable that the re-shuffler includes a plurality of cyclic circuits in which a request to transfer a packet, transmitted from scheduling algorithm, is initially set, in which case, a first stage cyclic circuit preferably cycles the initially set request in synchronization with a slot pulse generated in a predetermined cycle, and a cyclic circuit or cyclic circuits other than the first stage cyclic circuit preferably includes a gate circuit which is closed at a predetermined timing, and preferably cycles both (a) the initially set request, and (b) a request to transfer a packet, set by the previous stage cyclic circuit, in synchronization with the slot pulse, and transmits the requests to the next stage cyclic circuit.

It is preferable that the shuffler includes (a) a plurality of cyclic circuits in which precedence data indicative of N orders of precedence is initially set, and (b) N selectors each of which selects one of the N requests in response to an output transmitted from a final stage cyclic circuit, in which case, a cyclic circuit or cyclic circuits other than a final stage cyclic circuit preferably cycles both (a) the initially set precedence data and (b) precedence data set by the previous stage cyclic circuit in synchronization with a carry signal transmitted from the next stage cyclic circuit, and transmits those precedence data to the next stage cyclic circuit, and a final stage cyclic circuit preferably cycles both (a) the initially set precedence data and (b) the precedence data set by the previous stage cyclic circuit in synchronization with a slot pulse generated in a predetermined cycle, and supplies those precedence data to the N selectors.

It is preferable that the shuffler includes (a) a plurality of cyclic circuits in which precedence data indicative of N orders of precedence is initially set, and (b) N selectors each of which selects one of the N requests in response to an output transmitted from a final stage cyclic circuit, in which case, a cyclic circuit or cyclic circuits other than a final stage cyclic circuit preferably cycles both (a) the initially set precedence data and (b) precedence data set by the previous stage cyclic circuit in synchronization with a slot pulse generated in a predetermined cycle, and transmits those precedence data to the next stage cyclic circuit, and a final stage cyclic circuit preferably cycles both (a) the initially set precedence data and (b) the precedence data set by the previous stage cyclic circuit in synchronization with the slot pulse, and supplies those precedence data to the N selectors.

It is preferable that the shuffler includes (a) a plurality of cyclic circuits in which precedence data indicative of N orders of precedence is initially set, and (b) N selectors each of which selects one of the N requests in response to an output transmitted from a final stage cyclic circuit, in which case, a cyclic circuit or cyclic circuits other than a final stage cyclic circuit preferably includes a gate circuit which is closed at a predetermined timing, and cycles both (a) the initially set precedence data, and (b) precedence data set by the previous stage cyclic circuit in synchronization with a slot pulse transmitted through the gate circuit in a predetermined cycle, and transmits those precedence data to the next stage cyclic circuit, and a final stage cyclic circuit preferably cycles both (a) the initially set precedence data and (b) precedence data set by the previous stage cyclic circuit in synchronization with the slot pulse.

In another aspect of the present invention, there is provided a method of scheduling a packet switch including at least one input into which a packet is input, a switch which receives the packet from the input and switches an output through which the packet is transmitted, and a scheduler which controls the switch, the method including the steps of (a) shuffling an order of precedence in a first request transmitted from the input to transfer the packet, (b) determining the output, based on the first request having the order of precedence having been shuffled in the step (a), and producing a second request to transfer a packet which second request is associated with the first request having the order of precedence having been shuffled in the step (a), and (c) re-shuffling an order of precedence of the second request to be identical with the order of precedence in the first request as found before having been shuffled in the step (a), and returning the thus turned order of precedence back to the input.

The input may be designed to have N input port(s) wherein N is an integer equal to or greater than 1, in which case, an order of precedence in N request(s) to transfer a packet, transmitted through the N input port(s) may be shuffled in the step (a) so as to define N! patterns of an order of precedence.

The input may be designed to have N input port(s) wherein N is an integer equal to or greater than 1, in which case, an order of precedence in N request(s) to transfer a packet, transmitted through the N input port(s) may be shuffled in the step (a) so as to define M patterns of an order of precedence wherein M is a least common multiple of N, N–1, N–2, - - - , 3, 2.

The input may be designed to have N input port(s) wherein N is an integer equal to or greater than 1, in which case, an order of precedence in N request(s) to transfer a packet, transmitted through the N input port(s) may be shuffled in the step (a) so as to define first M patterns of an order of precedence, and then, may be further shuffled to define second M patterns of an order of precedence, wherein M is a least common multiple of N, N–1, N–2, - - - , 3, 2.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 8 is a table showing an operation of the shuffler illustrated in FIG. 6.

FIG. 11 is a table showing an operation of the re-shuffler illustrated in FIG. 10.

DESCRIPTION OF THE PREFERRED EMBODIMENTS

Preferred embodiments in accordance with the present invention will be explained hereinbelow with reference to drawings.

A packet switch in accordance with an embodiment of the present invention is an input buffer type switch.

Figure 1:
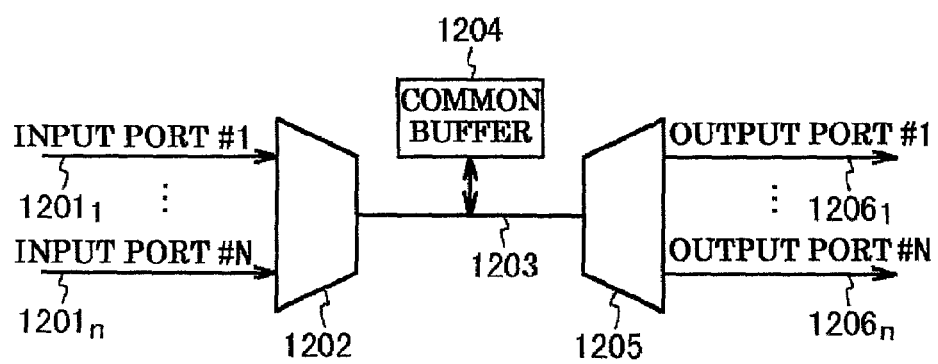
FIG. 1 is a block diagram of an example of a conventional common buffer type switch.
Figure 2:
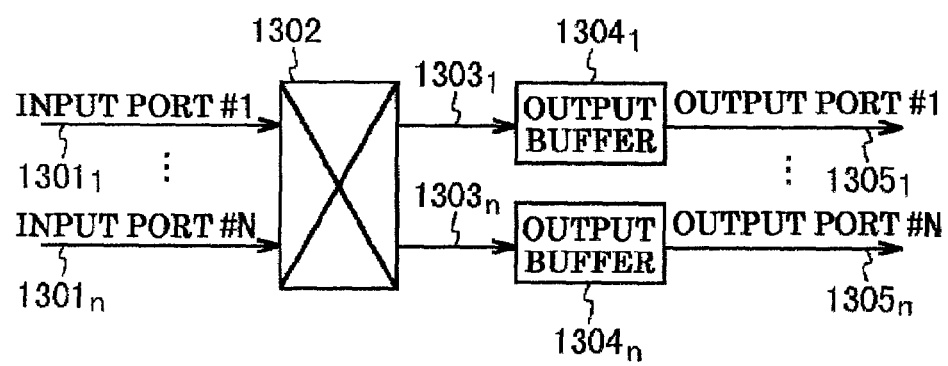
FIG. 2 is a block diagram of an example of a conventional output buffer type switch.
Figure 3:
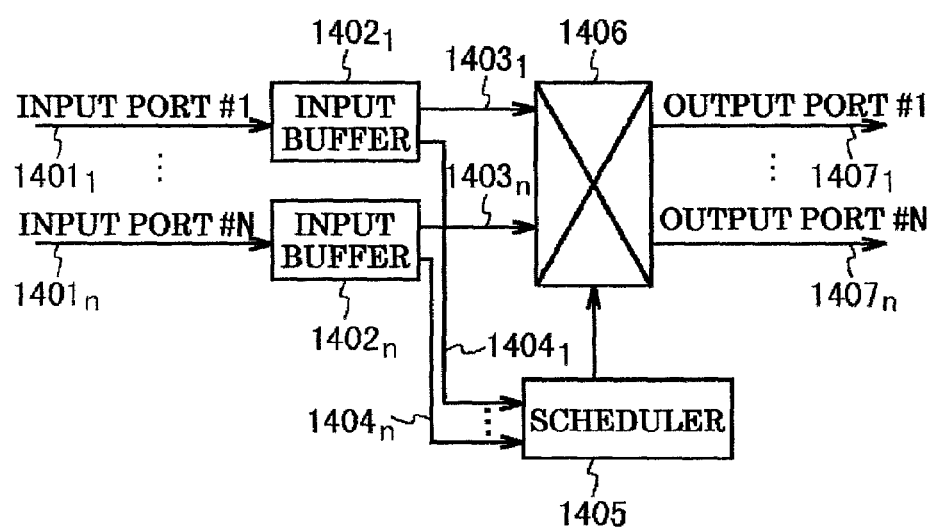
FIG. 3 is a block diagram of an example of a conventional input buffer type switch.
Figure 4:
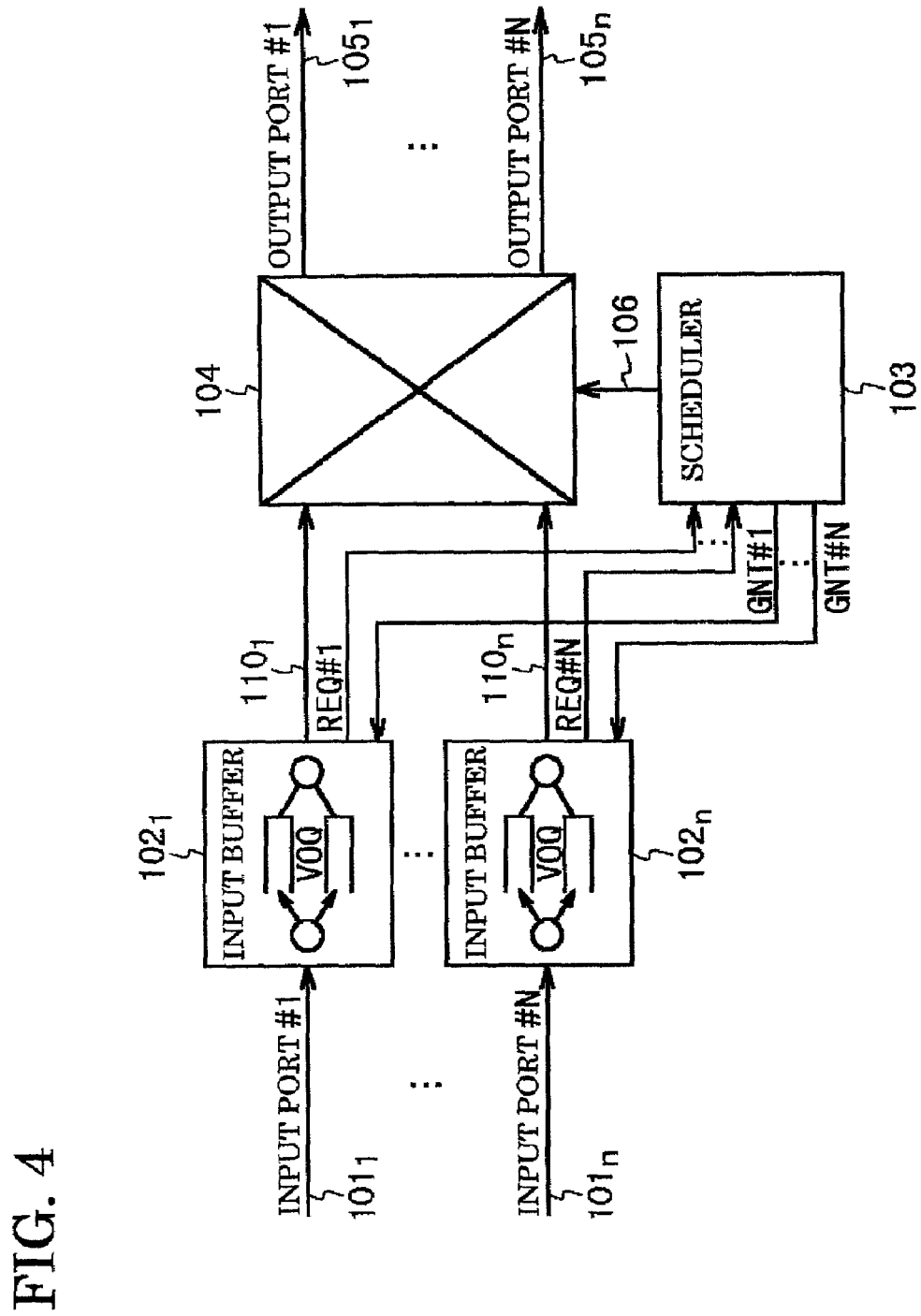
FIG. 4 is a block diagram of a packet switch in accordance with an embodiment of the present invention.

FIG. 4 is a block diagram of the packet switch in accordance with the embodiment. The packet switch is comprised of a plurality of input buffers $102_1$ to $102n$, a scheduler 103, and a switch 104.

The input buffers $102_1$ to $102n$ receive packets from input ports $101_1$ to $101n$. Each of the input buffers $102_1$ to $102n$ includes virtual output queues (VOQs) in association with output ports. Each of the input buffers $102_1$ to $102n$ queues the received packets for each of the output ports in accordance with address data included in the received packets.

The input buffers $102_1$ to $102n$ transmit requests REQ#1 to REQ#N which are requests to transfer a packet, to the scheduler 103 in order to transfer the received packets to an output port $105_1$ to $105n$ designated by address data.

On receipt of grants GNT#1 to GNT#N indicative of an allowance to transfer a packet, from the scheduler, the input buffers $102_1$ to $102n$ transfers the packets which are queued into virtual output queues VOQ for each of the output ports $105_1$ to $105n$, to the switch 104.

The scheduler 103 schedules the output ports $105_1$ to $105n$ to which the packets are to be transmitted, based on the requests REQ#1 to REQ#N transmitted from the input buffers $102_1$ to $102n$, and transmits a setting signal 106 indicative of results of scheduling the output ports $105_1$ to $105n$, to the switch 104.

As mentioned earlier, the scheduler 103 transmits grants GNT#1 to GNT#N to the input buffers $102_1$ to $102n$.

The switch is designed to include a plurality of switches for routing. A control of opening and closing those routing switches, that is, selection of the output ports $105_1$ to $105n$ is carried out in accordance with the setting signal 106 transmitted from the scheduler 103.

The switch 104 switches packets $110_1$ to $110n$ transmitted from the input buffers $102_1$ to $102n$ to the output ports $105_1$ to $105n$ designated by the setting signal 106.

Figure 5:
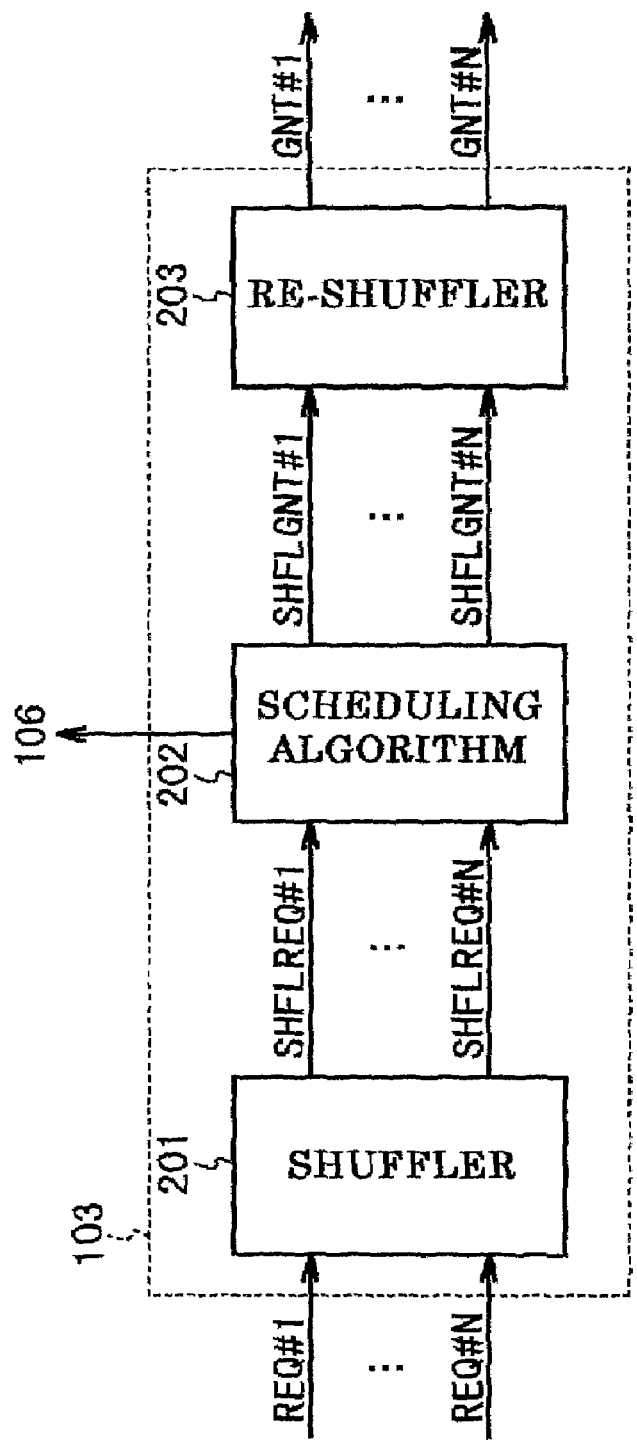
FIG. 5 is a block diagram of a scheduler which is a part of the packet switch illustrated in FIG. 3.

FIG. 5 is a block diagram of the scheduler 103. The scheduler 103 is comprised of a shuffler 201, a scheduling algorithm 202, and a re-shuffler 203.

The shuffler 201 shuffles an order of precedence in the requests REQ#1 to REQ#N, and outputs the thus shuffled requests SHFLREQ#1 to SHFLREQ#N to the scheduling algorithm 202.

The scheduling algorithm 202 carries out scheduling on the assumption that the shuffled request SHFLREQ#1 has a highest order of precedence, and the shuffled request SHFLREQ#N has a lowest order of precedence, and transmits the setting signal 106 indicative of results of scheduling, to the switch 104. The scheduling algorithm 202 activates shuffled grants SHFLGNT#1 to SHFLGNT#N indicative of an allowance to transfer a packet and associated with the shuffled requests SHFLREQ#1 to SHFLREQ#N, based on the results of scheduling, and supplies the thus activated shuffled grants SHFLGNT#1 to SHFLGNT#N to the re-shuffler 203.

Various algorithms may be used for carrying out the above-mentioned scheduling.

The re-shuffler 203 re-shuffles an order of precedence in the shuffled grants SHFLGNT#1 to SHFLGNT#N. That is, the re-shuffler 203 returns an order of precedence in the requests REQ#1 to REQ#N, having been shuffled by the shuffler 201, back to an original order of precedence, namely, an order of precedence before shuffled by the shuffler 201.

The shuffled requests SHFLREQ#1 to SHFLREQ#N having been reshuffled by the re-shuffler 203 are supplied to the input buffers $102_1$ to $102n$ as grants GNT#1 to GNT#N.

For instance, the scheduling algorithm 202 is designed to include an algorithm which determines an order of precedence in the input ports $101_1$ to $101n$, based on a location at which a request is input thereinto. Such a location may be comprised of a physical location of a circuit, if the scheduler 103 is comprised of hardware, or may be comprised of a number assigned to a variable, if the scheduler 103 is comprised of software.

In accordance with such an algorithm as mentioned above, the scheduler 103 carries out scheduling by shuffling the requests REQ#1 to REQ#N, and then, re-shuffles the shuffled requests SHFLREQ#1 to SHFLREQ#N to there by output the grants GNT#1 to GNT#N.

As a result, an order of precedence in the requests transmitted from the input ports $101_1$ to $101n$ is varied, ensuring a uniform frequency of using the switch 104 for each of the input ports $101_1$ to $101n$.

Hereinbelow are explained embodiments of the shuffler 201 and the re-shuffler 203. In the embodiments explained hereinbelow, the shuffler 201 and the re-shuffler 203 are applied to a switch having four input ports and four output ports. However, the number of input and output ports is not to be limited to four, and may be determined as desired.

First Embodiment

Figure 6:
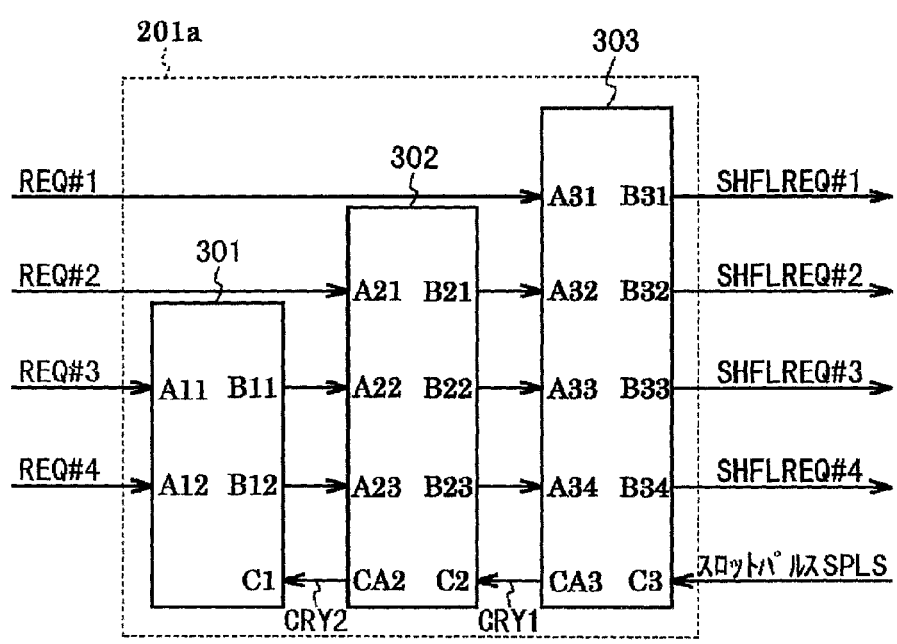
FIG. 6 is a block diagram of a shuffler in accordance with the first embodiment.

FIG. 6 is a block diagram of the shuffler 201a in accordance with the first embodiment.

The shuffler 201a is comprised of a first stage cyclic circuit 301 for cycling an order of precedence, a second stage cyclic circuit 302 for cycling an order of precedence, and a third stage cyclic circuit 303 for cycling an order of precedence. Each of the first to third stage cyclic circuits 301 to 303 may be comprised of a ring shift register.

The first stage cyclic circuit 301 includes a first order input terminal A1, a second order input terminal A12, a first order output terminal B11, a second order output terminal B12, and a cyclic terminal C1.

The first order input terminal A11 receives a request REQ#3, and the second order input terminal A12 receives a request REQ#4. The first order output terminal B11 is connected to a second order input terminal A12 of the second stage cyclic circuit 302, and the second order output terminal B12 is connected to a third order input terminal A23 of the second stage cyclic circuit 302. The cyclic terminal C1 receives a carry signal CRY2 from the second stage cyclic circuit 302.

The requests REQ#3 and REQ#4 are initially set in the first stage cyclic circuit 301. On each receipt of the carry signal CRY2, the first stage cyclic circuit 301 cycles the requests REQ#3 and REQ#4, and outputs the thus cycled requests REQ#3 and REQ#4. Hence, in an initial status, the request REQ#3 is transmitted from the first order output terminal B11, and the request REQ#4 is transmitted from the second order output terminal B12.

After receiving the carry signal CRY2 at the cyclic terminal C1 from the second stage cyclic circuit 302, the first stage cyclic circuit 301 transmits the request REQ#4 from the first order output terminal B11, and the request REQ#3 from the second order output terminal B12.

On every receipt of the carry signal CRY2 at the cyclic terminal C1 from the second stage cyclic circuit 302, the first stage cyclic circuit 301 cycles the requests REQ#3 and REQ#4, and outputs the thus cycled requests REQ#3 and REQ#4.

The second stage cyclic circuit 302 includes a first order input terminal A21, a second order input terminal A22, a third order input terminal A23, a first order output terminal B21, a second order output terminal B22, a third order output terminal B23, a cyclic terminal C2, and a carry terminal CA2.

The first order input terminal A21 receives a request REQ#2. The second order input terminal A22 receives a signal transmitted from the first order output signal B11 of the first stage cyclic circuit 301, and the third order input terminal A23 receives a signal transmitted from the second order output signal B12 of the first stage cyclic circuit 301.

The first order output terminal B21 is connected to a second order input terminal A32 of the third stage cyclic circuit 303, the second order output terminal B22 is connected to a third order input terminal A33 of the third stage cyclic circuit 303, and the third order output terminal B23 is connected to a fourth order input terminal A34 of the third stage cyclic circuit 303.

The cyclic terminal C2 receives a carry signal CRY1 from the third stage cyclic circuit 303. The second stage cyclic circuit 302 transmits a carry signal CRY2 at the carry terminal CA2 to the cyclic terminal C1 of the first stage cyclic circuit 301.

A request REQ#2 and the requests REQ#3 and REQ#4 both having passed through the first stage cyclic circuit 301 are initially set in the second state cyclic circuit 302.

On each receipt of the carry signal CRY1 at the cyclic terminal C2 from the third stage cyclic circuit 303, the second stage cyclic circuit 302 cycles the initially set requests REQ#2 to REQ#4, and outputs the thus cycled REQ#2 to REQ#4. Hence, in an initial status, the request REQ#2 is output from the first order output terminal B21, the request REQ#3 is output from the second order output terminal B22, and the request REQ#4 is output from the third order output terminal B23.

On receipt of the carry signal CRY1 at the cyclic terminal C2 from the third stage cyclic circuit 303, the second stage cyclic circuit 302 outputs the request REQ#3 from the first order output terminal B21, the request REQ#4 from the second order output terminal B22, and the request REQ#2 from the third order output terminal B23. On further receipt of the carry signal CRY1, the second stage cyclic circuit 302 outputs the request REQ#4 from the first order output terminal B21, the request REQ#2 from the second order output terminal B22, and the request REQ#3 from the third order output terminal B23.

On every receipt of the carry signal CRY1 at the cyclic terminal C2 from the third stage cyclic circuit 303, the second stage cyclic circuit 302 cycles the requests REQ#2, REQ#3 and REQ#4, and outputs the thus cycled requests REQ#2, REQ#3 and REQ#4.

On every three receipt of the carry signal CRY1, the carry terminal CA2 transmits the carry signal CRY2 to the cyclic terminal C1 of the first stage cyclic circuit 301. The signals having been cycled in accordance with the carry signal CRY2 and transmitted from the first stage cyclic circuit 301 are loaded into lowermost and second lowermost bits in the second stage cyclic circuit 302.

The third stage cyclic circuit 303 includes a first order input terminal A31, a second order input terminal A32, a third order input terminal A33, a fourth order input terminal A34, a first order output terminal B31, a second order output terminal B32, a third order output terminal B33, a fourth order output terminal B34, a cyclic terminal C3, and a carry terminal CA3.

The first order input terminal A31 receives a request REQ#1. The second order input terminal A32 receives a signal transmitted from the first order output signal B21 of the second stage cyclic circuit 302, the third order input terminal A33 receives a signal transmitted from the second order output signal B22 of the second stage cyclic circuit 302, and the fourth order input terminal A34 receives a signal transmitted from the third order output signal B23 of the second stage cyclic circuit 302.

The first to fourth order output terminals B31, B32, B33 and B34 output the shuffled requests SHFLREQ#1, SHFLREQ#2, SHFLREQ#3 and SHFLREQ#4, respectively. The cyclic terminal C3 of the third stage cyclic circuit 303 receives a slot pulse SPLS from a control circuit (not illustrated). The slot pulse is transmitted at every slot during which the scheduler 103 makes one operation.

The carry terminal CA3 transmits a carry signal CRY1 to the cyclic terminal C2 of the second stage cyclic circuit 302.

The request REQ#1, the request REQ#2 having passed through the second stage cyclic circuit 302, and the requests REQ#3 and REQ#4 both having passed through both the first and second stage cyclic circuits 301 and 302 are initially set in the third state cyclic circuit 303.

On each receipt of the slot pulse SPLS at the cyclic terminal C3 from the control circuit, the third stage cyclic circuit 303 cycles the initially set requests REQ#1 to REQ#4, and outputs the thus cycled REQ#1 to REQ#4.

Hence, in an initial status, the request REQ#1 is output from the first order output terminal B31 as the shuffled request SHFLREQ#1, the request REQ#2 is output from the second order output terminal B32 as the shuffled request SHFLREQ#2, the request REQ#3 is output from the third order output terminal B33 as the shuffled request SHFLREQ#3, and the request REQ#4 is output from the fourth order output terminal B34 as the shuffled request SHFLREQ#4.

On receipt of the slot pulse SPLS at the cyclic terminal C3 from the control circuit, the third stage cyclic circuit 303 outputs the request REQ#2 from the first order output terminal B31, the request REQ#3 from the second order output terminal B32, the request REQ#4 from the third order output terminal B33, and the request REQ#1 from the fourth order output terminal B34. On further receipt of the slot pulse SPLS, the third stage cyclic circuit 303 outputs the request REQ#3 from the first order output terminal B31, the request REQ#4 from the second order output terminal B32, the request REQ#1 from the third order output terminal B33, and the request REQ#2 from the fourth order output terminal B34.

On every receipt of the slot pulse SPLS at the cyclic terminal C3 from the control circuit, the third stage cyclic circuit 303 cycles the requests REQ#1, REQ#2, REQ#3 and REQ#4, and outputs the thus cycled requests REQ#1, REQ#2, REQ#3 and REQ#4.

On every four receipt of the slot pulse SPLS, the carry terminal CA3 transmits the carry signal CRY1 to the cyclic terminal C2 of the second stage cyclic circuit 302. The signals having been cycled in accordance with the carry signal CRY1 and transmitted from the second stage cyclic circuit 302 are loaded into lowermost, second lowermost and third lowermost bits in the third stage cyclic circuit 303.

Figure 7:
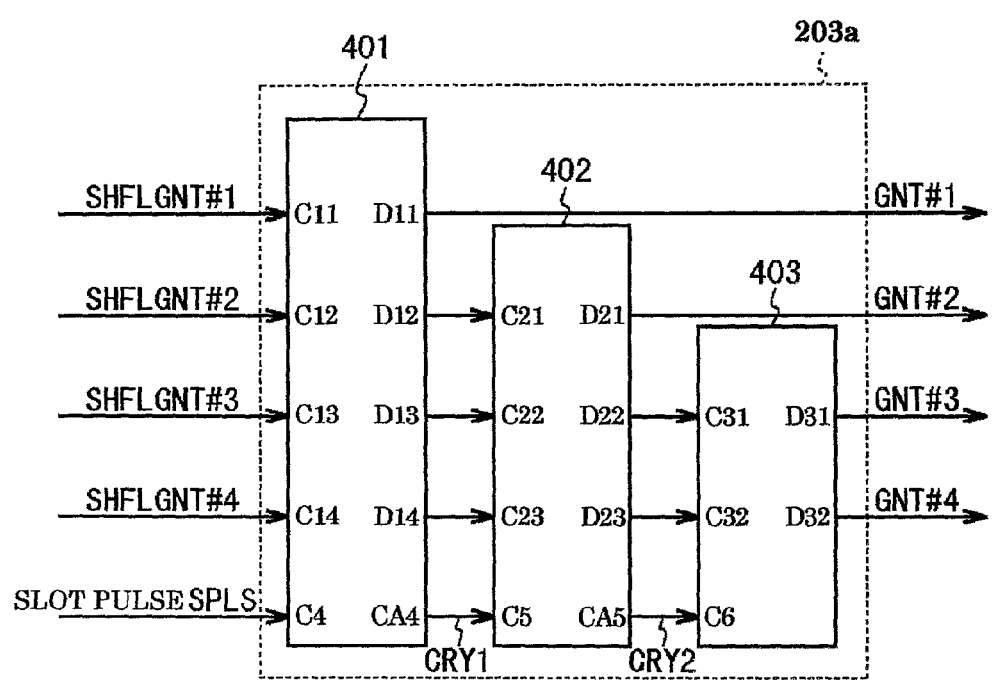
FIG. 7 is a block diagram of a re-shuffler in accordance with the first embodiment.

FIG. 7 is a block diagram of the re-shuffler 203a in accordance with the first embodiment. The re-shuffler 203a constitutes the scheduler 103 together with the shuffler 201a illustrated in FIG. 6 and the scheduling algorithm 202.

The re-shuffler 203a is comprised of a first stage cyclic circuit 401 for cycling an order of precedence, a second stage cyclic circuit 402 for cycling an order of precedence, and a third stage cyclic circuit 403 for cycling an order of precedence. Each of the first to third stage cyclic circuits 401 to 403 may be comprised of a ring shift register.

The first stage cyclic circuit 401 includes a first order input terminal C11, a second order input terminal C12, a third order input terminal C13, a fourth order input terminal C14, a first order output terminal D11, a second order output terminal D12, a third order output terminal D13, a fourth order output terminal D14, a cyclic terminal C4, and a carry terminal CA4.

The first order input terminal C11 receives the shuffled grant SHFLGNT#1, the second order input terminal C12 receives the shuffled grant SHFLGNT#2, the third order input terminal C13 receives the shuffled grant SHFLGNT#3, and the fourth order input terminal C14 receives the shuffled grant SHFLGNT#4.

The first order output terminal D11 outputs the shuffled grant SHFLGNT#1 as a grant GNT#1. The second order output terminal D12 is connected to the first order input terminal C21 of the second stage cyclic circuit 402, the third order output terminal D13 is connected to the second order input terminal C22 of the second stage cyclic circuit 402, and the fourth order output terminal D14 is connected to the third order input terminal C23 of the second stage cyclic circuit 402.

The cyclic terminal C4 of the first stage cyclic circuit 401 receives a slot pulse SPLS from a control circuit (not illustrated).

The carry terminal CA4 transmits a carry signal CRY1 to the cyclic terminal CS of the second stage cyclic circuit 402.

The shuffled grants SHFLGNT#1 to SHFLGNT#¥4 are initially set in the first stage cyclic circuit 401. On each receipt of the slot pulse SPLS at the cyclic terminal C4, the first stage cyclic circuit 401 cycles the shuffled grants SHFLGNT#1 to SHFLGNT#¥4, and outputs the thus cycled shuffled grants SHFLGNT#1 to SHFLGNT#¥4.

Hence, in an initial status, the shuffled grant SHFLGNT#1 is output from the first order output terminal D11, the shuffled request SHFLREQ#2 is output from the second order output terminal D12, the shuffled request SHFLREQ#3 is output from the third order output terminal D13, and the shuffled request SHFLREQ#4 is output from the fourth order output terminal D14. The shuffled grant SHFLGNT#1 is externally output from the first order output terminal D11 as the grant GNT#1.

On receipt of the slot pulse SPLS at the cyclic terminal C4 from the control circuit, the first stage cyclic circuit 401 outputs the shuffled grant SHFLGNT#4 from the first order output terminal D11, the shuffled grant SHFLGNT#1 from the second order output terminal D12, the shuffled grant SHFLGNT#2 from the third order output terminal D13, and the shuffled grant SHFLGNT#3 from the fourth order output terminal D14. On further receipt of the slot pulse SPLS, the first stage cyclic circuit 401 outputs the shuffled grant SHFLGNT#3 from the first order output terminal D11, the shuffled grant SHFLGNT#4 from the second order output terminal D12, the shuffled grant SHFLGNT#1 from the third order output terminal D13, and the shuffled grant SHFLGNT#2 from the fourth order output terminal D14.

On every receipt of the slot pulse SPLS at the cyclic terminal C4 from the control circuit, the first stage cyclic circuit 401 cycles the shuffled grants SHFLGNT#1 to SHFLGNT#4, and outputs the thus cycled shuffled grants SHFLGNT#1 to SHFLGNT#4.

On every four receipt of the slot pulse SPLS, the carry terminal CA4 transmits the carry signal CRY1 to a cyclic terminal C5 of the second stage cyclic circuit 402. On receipt of the carry signal CRY1 from the first stage cyclic circuit 401, the second stage cyclic circuit 402 loads therein the cycled signals transmitted from the first stage cyclic circuit 401, that is, the cycled shuffled grants SHFLGNT#2 to SHFLGNT#4.

The second stage cyclic circuit 402 includes a first order input terminal C21, a second order input terminal C22, a third order input terminal C23, a first order output terminal D21, a second order output terminal D22, a third order output terminal D23, a cyclic terminal C5, and a carry terminal CA5.

The first order input terminal C21 receives the shuffled grant SHFLGNT#2 transmitted from the second order output terminal D12 of the first stage cyclic circuit 401, the second order input terminal C22 receives the shuffled grant SHFLGNT#3 transmitted from the third order output terminal D13 of the first stage cyclic circuit 401, and the third order input terminal C23 receives the shuffled grant SHFLGNT#4 transmitted from the fourth order output terminal D14 of the first stage cyclic circuit 401.

The first order output terminal D21 outputs the shuffled grant SHFLGNT#2 as a grant GNT#2. The second order output terminal D22 is connected to the first order input terminal C31 of the third stage cyclic circuit 403, and the third order output terminal D23 is connected to the second order input terminal C32 of the third stage cyclic circuit 403.

The cyclic terminal C5 of the second stage cyclic circuit 402 receives the carry signal CRY1 from the carry terminal CA4 of the first stage cyclic circuit 401.

The carry terminal CA5 transmits a carry signal CRY2 to the cyclic terminal C6 of the third stage cyclic circuit 403.

The shuffled grants SHFLGNT#2 to SHFLGNT#¥4 having passed through the first stage cyclic circuit 401 are initially set in the second stage cyclic circuit 402. On each receipt of the carry signal CRY1 at the cyclic terminal C5, the second stage cyclic circuit 402 cycles the shuffled grants SHFLGNT#2 to SHFLGNT#¥4, and outputs the thus cycled shuffled grants SHFLGNT#2 to SHFLGNT#¥4.

Hence, in an initial status, the shuffled grant SHFLGNT#2 is output from the first order output terminal D21, the shuffled request SHFLREQ#3 is output from the second order output terminal D22, and the shuffled request SHFLREQ#4 is output from the third order output terminal D23. The shuffled grant SHFLGNT#2 is externally output from the first order output terminal D21 as the grant GNT#2.

On receipt of the carry signal CRY1 at the cyclic terminal C5, the second stage cyclic circuit 402 outputs the shuffled grant SHFLGNT#4 from the first order output terminal D21, the shuffled grant SHFLGNT#2 from the second order output terminal D22, and the shuffled grant SHFLGNT#3 from the third order output terminal D23. On further receipt of the carry signal CRY1, the second stage cyclic circuit 402 outputs the shuffled grant SHFLGNT#3 from the first order output terminal D21, the shuffled grant SHFLGNT#4 from the second order output terminal D22, and the shuffled grant SHFLGNT#2 from the third order output terminal D23.

On every receipt of the carry signal CRY1 at the cyclic terminal C6 from the carry terminal CA4 of the first stage cyclic circuit 401, the second stage cyclic circuit 402 cycles the shuffled grants SHFLGNT#2 to SHFLGNT#4, and outputs the thus cycled shuffled grants SHFLGNT#2 to SHFLGNT#4.

On every three receipt of the carry signal CRY1, the carry terminal CA5 transmits the carry signal CRY2 to a cyclic terminal C6 of the third stage cyclic circuit 403. On receipt of the carry signal CRY2 from the second stage cyclic circuit 402, the third stage cyclic circuit 403 loads therein the cycled signals transmitted from the second stage cyclic circuit 402, that is, the cycled shuffled grants SHFLGNT#3 and SHFLGNT#4.

The third stage cyclic circuit 403 includes a first order input terminal C31, a second order input terminal C32, a first order output terminal D31, a second order output terminal D32, and a cyclic terminal C6.

The first order input terminal C31 receives the shuffled grant SHFLGNT#3 transmitted from the second order output terminal D22 of the second stage cyclic circuit 402, and the second order input terminal C32 receives the shuffled grant SHFLGNT#4 transmitted from the third order output terminal D23 of the second stage cyclic circuit 402.

The first order output terminal D31 outputs the shuffled grant SHFLGNT#3 as a grant GNT#3, and the second order output terminal D32 outputs the shuffled grant SHFLGNT#4 as a grant GNT#4.

The cyclic terminal C6 of the third stage cyclic circuit 403 receives the carry signal CRY2 from the carry terminal CA5 of the second stage cyclic circuit 402.

The shuffled grants SHFLGNT#3 and SHFLGNT#4 having passed through the first and second stage cyclic circuits 401 and 402 are initially set in the third stage cyclic circuit 403. On each receipt of the carry signal CRY2 at the cyclic terminal C6 from the carry terminal CA5 of the second stage cyclic circuit 402, the third stage cyclic circuit 402 cycles the shuffled grants SHFLGNT#3 and SHFLGNT#4, and outputs the thus cycled shuffled grants SHFLGNT#3 and SHFLGNT#4.

Hence, in an initial status, the shuffled grant SHFLGNT#3 is output from the first order output terminal D31 as the grant GNT#3, and the shuffled request SHFLREQ#4 is output from the second order output terminal D32 as the grant GNT#4.

On receipt of the carry signal CRY2 at the cyclic terminal C6, the third stage cyclic circuit 403 outputs the shuffled grant SHFLGNT#4 from the first order output terminal D31, and the shuffled grant SHFLGNT#3 from the second order output terminal D32. On further receipt of the carry signal CRY2, the third stage cyclic circuit 403 outputs the shuffled grant SHFLGNT#3 from the first order output terminal D31, and the shuffled grant SHFLGNT#4 from the second order output terminal D32.

On every receipt of the carry signal CRY2 at the cyclic terminal C6 from the carry terminal CA5 of the second stage cyclic circuit 402, the third stage cyclic circuit 403 cycles the shuffled grants SHFLGNT#3 and SHFLGNT#4, and outputs the thus cycled shuffled grants SHFLGNT#3 and SHFLGNT#4.

Hereinbelow is explained an operation of the above-mentioned shuffler 201a. The re-shuffler 203a operates inversely to the shuffler 201a, and hence, an operation of the re-shuffler 203a is omitted.

FIG. 8 is a table showing an operation of the first to third stage cyclic circuits 301 to 303 of the shuffler 201a.

As indicated in FIG. 8, the third stage cyclic circuit 303 increments a cycling degree at each of slots. The second stage cyclic stage 302 increments a cycling degree on receipt of the carry signal CRY1 which is transmitted when the third stage cyclic circuit 303 cycles the input signals in a round. The first stage cyclic stage 301 increments a cycling degree on receipt of the carry signal CRY2 which is transmitted when the second stage cyclic circuit 302 cycles the input signals in a round.

When the carry signal CRY1 is transmitted to the second stage cyclic circuit 302, the signals transmitted from the second stage cyclic circuit 302, that is, the requests REQ#2 to REQ#4 are loaded into lowermost three bits in the third stage cyclic circuit 303. When the carry signal CRY2 is transmitted to the first stage cyclic circuit 301, the signals transmitted from the first stage cyclic circuit 301, that is, the requests REQ#3 and REQ#4 are loaded into lowermost two bits in the second stage cyclic circuit 302.

Thus, a cycling degree in each of the first to third stage cyclic circuits 301 to 303, an order of precedence in each of the input ports $101_1$ to $101n$ after having passed through the first stage cyclic circuit 301, an order of precedence in each of the input ports $101_1$ to $101n$ after having passed through the second stage cyclic circuit 302, and an order of precedence in each of the input ports $101_1$ to $101n$ after having passed through the third stage cyclic circuit 303 are varied at each of the slots as shown in the table illustrated in FIG. 8.

A cycle of shuffling carried out by the shuffler 201a is defined as N×(N−1)×(N−2)× ×2=N!, wherein N is the number of the input ports. Hence, different patterns of an order of precedence from one another are generated in all the slots. That is, it is possible to generate all patterns of an order of precedence in a cycle of shuffling.

Second Embodiment

Figure 9:
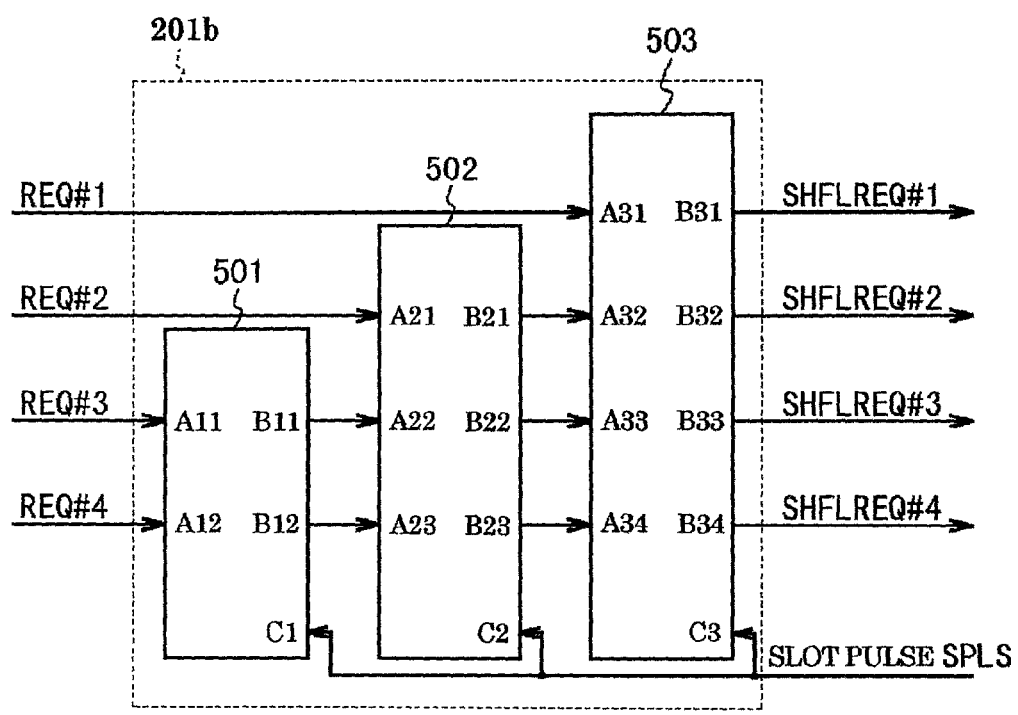
FIG. 9 is a block diagram of a shuffler in accordance with the second embodiment.

FIG. 9 is a block diagram of a shuffler 201b in accordance with the second embodiment.

The shuffler 201b is comprised of a first stage cyclic circuit 501, a second stage cyclic circuit 502, and a third stage cyclic circuit 503. The first to third stage cyclic circuits 501 to 503 are designed to have the same structure as the structures of the first to third stage cyclic circuits 301 to 303 of the shuffler 201a in accordance with the first embodiment, illustrated in FIG. 6. The shuffler 201b is different from the shuffler 201a in accordance with the first embodiment only in that the slot pulses SPLS are input into the cyclic terminals C1, C2 and C3.

In the shuffler 201a in accordance with the first embodiment, if the first and second stage cyclic circuits 301 and 302 receive the carry signal CRY2 and CRY1, respectively, the storage of the previous stage cyclic circuit shuffled by the carry signal CRY2 or CRY1 is loaded to the next stage cyclic circuit for determining an order of precedence in the requests. In the shuffler 201b in accordance with the second embodiment, an order of precedence in the requests is determined by loading the storage of the previous stage cyclic circuit shuffled by the slot pulse SPLS, and further by cycling the storage.

Figure 10:
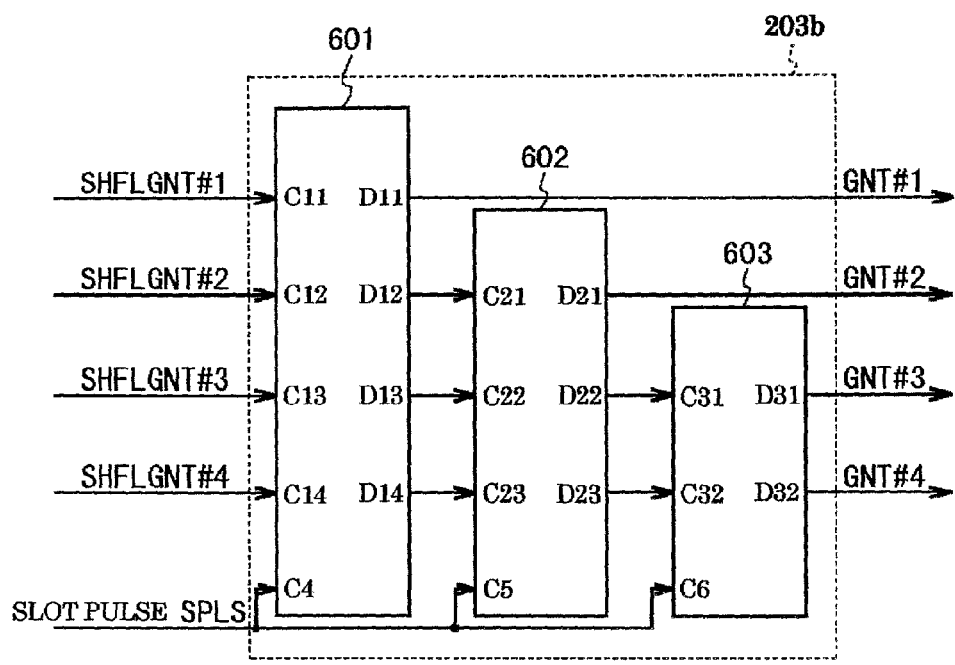
FIG. 10 is a block diagram of a re-shuffler in accordance with the second embodiment.

FIG. 10 is a block diagram of a re-shuffler 203b in accordance with the second embodiment. The re-shuffler 203b constitutes the scheduler 103 together with the shuffler 201b illustrated in FIG. 9 and the scheduling algorithm 202.

The re-shuffler 203b is comprised of a first stage cyclic circuit 601, a second stage cyclic circuit 602, and a third stage cyclic circuit 603. The first to third stage cyclic circuits 601 to 603 are designed to have the same structure as the structures of the first to third stage cyclic circuits 401 to 403 of the re-shuffler 203a in accordance with the first embodiment, illustrated in FIG. 7. The re-shuffler 203b is different from the re-shuffler 203a in accordance with the first embodiment only in that the slot pulses SPLS are input into the cyclic terminals C4, C5 and C6.

In the shuffler 201a in accordance with the first embodiment, if the first and second stage cyclic circuits 301 and 302 receive the carry signal CRY2 and CRY1, respectively, the storage of the previous stage cyclic circuit shuffled by the carry signal CRY2 or CRY1 is loaded to the next stage cyclic circuit for determining an order of precedence in the grants. In the shuffler 201b in accordance with the second embodiment, an order of precedence in the grants is determined by loading the storage of the previous stage cyclic circuit shuffled by the slot pulse SPLS, into the next stage cyclic circuit, and further by cycling the storage.

Hereinbelow is explained an operation of the above-mentioned shuffler 201b. The re-shuffler 203b operates inversely to the shuffler 201b, and hence, an operation of the re-shuffler 203b is omitted.

FIG. 11 is a table showing an operation of the first to third stage cyclic circuits 501 to 503 of the shuffler 201b.

The shuffler 201a in accordance with the first embodiment can generate all patterns of an order of precedence. However, since a cycle of shuffling is equal to N!, if the number N of the input ports were increased, a cycle of shuffling becomes significantly long.

In addition, a cycling degree remains unchanged in a short period in the previous stage cyclic circuit. Hence, a frequency of using the switch 104 for switching the input ports shuffled by the previous stage cyclic circuit becomes non-uniform.

FIG. 11 is a table showing an operation of the first to third stage cyclic circuits 501 to 503 of the shuffler 201b.

As indicated in FIG. 11, the first to third stage cyclic circuits 501 to 503 increments a cycling degree at each of slots. As a result, a cycling degree in the previous stage cyclic circuit is varied at each of slots, which ensures a uniform frequency of using the switch 104 for each of the input ports even in a short period.

A cycle of shuffling carried out by the shuffler 201b is equal to a least common multiple of N, N–1, N–2, - - - , 2. This cycle of shuffling is shorter than the cycle of shuffling in the first embodiment, that is, N!.

Third Embodiment

Figure 12:
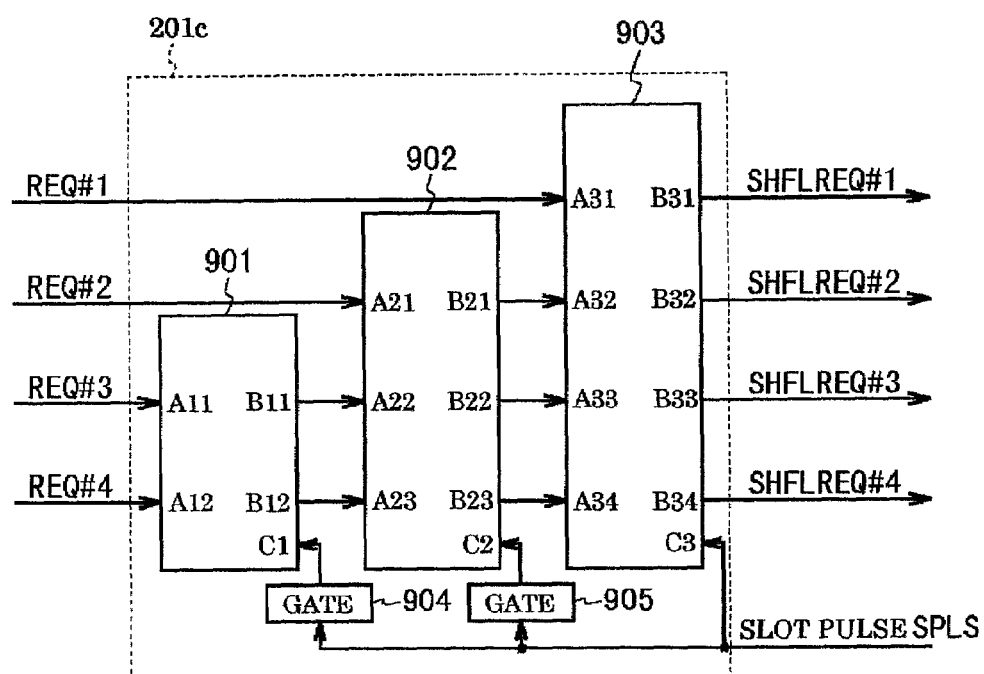
FIG. 12 is a block diagram of a shuffler in accordance with the third embodiment.

FIG. 12 is a block diagram of a shuffler 201c in accordance with the third embodiment.

The shuffler 201c is comprised of a first stage cyclic circuit 901, a second stage cyclic circuit 902, a third stage cyclic circuit 903, a first gate 904, and a second gate 905.

The first to third stage cyclic circuits 901 to 903 are designed to have the same structure as the structures of the first to third stage cyclic circuits 501 to 503 of the shuffler 201b in accordance with the second embodiment, illustrated in FIG. 9, respectively. The shuffler 201c is different from the shuffler 201b in accordance with the second embodiment only in that the slot pulse SPLS is input into the cyclic terminal C1 of the first stage cyclic circuit 901 through the first gate 904, and the slot pulse SPLS is input into the cyclic terminal C2 of the second stage cyclic circuit 902 through the second gate 905.

The above-mentioned shuffler 201b in accordance with the second embodiment has an advantage that a cycle of shuffling is shorter than the same of the shuffler 201a in accordance with the first embodiment. This is because that the shuffler 201b in accordance with the second embodiment produces just a part of the N! patterns of an order of precedence produced by the shuffler 201a in accordance with the first embodiment. This means that there exists a pattern or patterns of an order of precedence which is(are) not produced by the shuffler 201b.

In the shuffler 201c in accordance with the third embodiment, the first and second gates 904 and 905 stop transmission of the slot pulse SPLS to the cyclic terminals C1 and C2 by one slot in every predetermined number of shufflings.

For instance, a controller (not illustrated) operates the first and second gates 904 and 905 such that the first gate 904 stops transmission of the slot pulse SPLS to the cyclic terminal C1 by one slot in every three rounds of cycling the requests, and the second gate 905 stops transmission of the slot pulse SPLS to the cyclic terminal C2 by one slot in every round of cycling the requests.

As a result, an offset is given to a cycling degree in each of the first to third stage cyclic circuits 901 to 903 for every round of cycling the requests, which ensures that a pattern or patterns of an order of precedence is(are) produced in the third embodiment, though the pattern or patterns is(are) not produced in the second embodiment.

A re-shuffler associated with the shuffler 201c in accordance with the third embodiment may be accomplished by adding gates such as the first and second gates 904 and 905 to the second and third stage cyclic circuits 602 and 603 in the re-shuffler 203b illustrated in FIG. 10, and transmitting the slot pulses SPLS to the cyclic terminals C5 and C6 of the second and third stage cyclic circuits 602 and 603 through the thus added gates.

Fourth Embodiment

Figure 13:
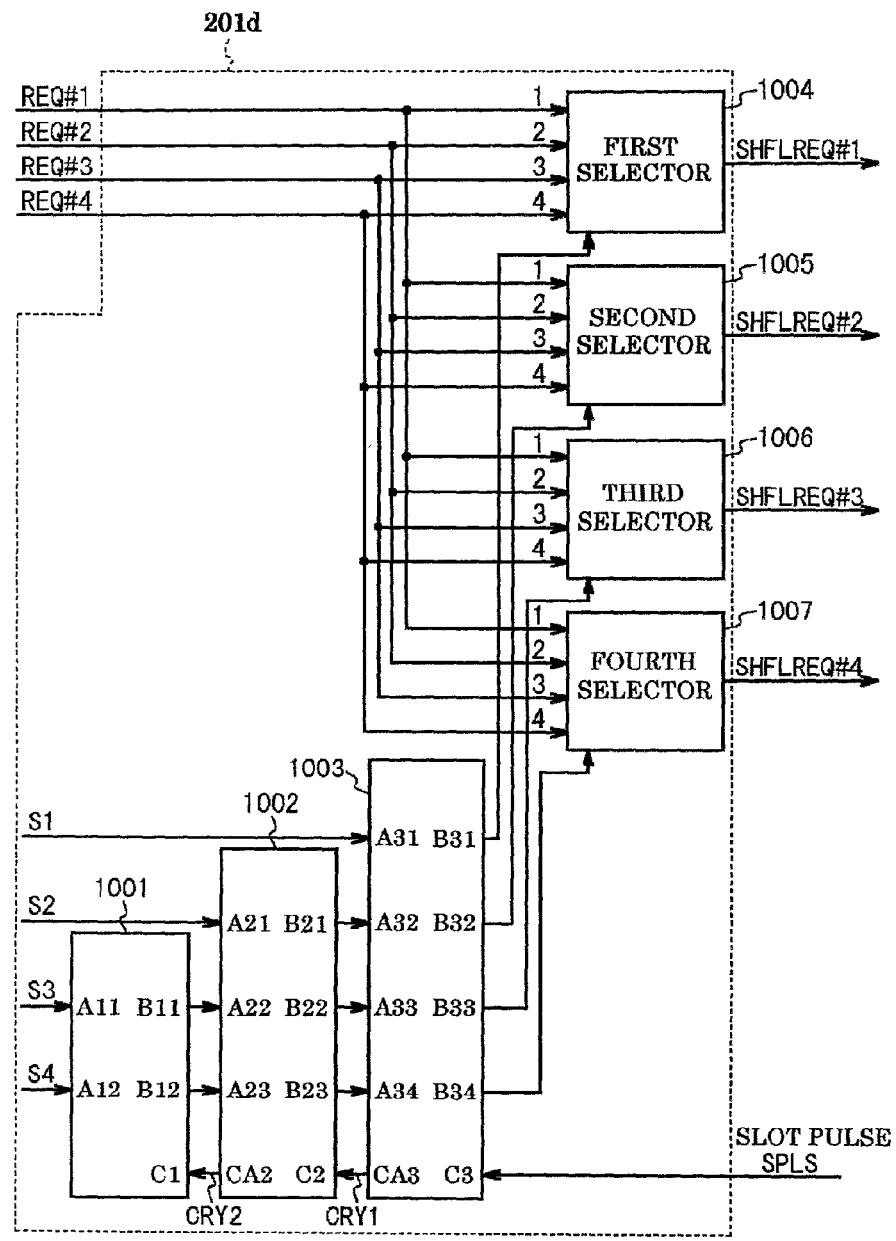
FIG. 13 is a block diagram of a shuffler in accordance with the fourth embodiment.

FIG. 13 is a block diagram of a shuffler 201d in accordance with the fourth embodiment.

The shuffler 201d is comprised of a first stage cyclic circuit 1001, a second stage cyclic circuit 1002, a third stage cyclic circuit 1003, a first selector 1004, a second selector 1005, a third selector 1006, and a fourth selector 1007.

The first to third stage cyclic circuits 1001 to 1003 are designed to have the same structure as the structures of the first to third stage cyclic circuits 301 to 303 in the shuffler 201a in accordance with the first embodiment. The third stage cyclic circuit 1003 receives data S1 about an order of precedence at the first order input terminal A31 in place of the request REQ#1, and the second stage cyclic circuit 1002 receives data S2 about an order of precedence at the second order input terminal A21 in place of the request REQ#2. The first stage cyclic circuit 1001 receives data S3 about an order of precedence at the first order input terminal A11 in place of the request REQ#3, and data S4 about an order of precedence at the second order input terminal A12 in place of the request REQ#4.

Each of data S1 to S4 is constituted of 2-bit data. For instance, data S1 may be expressed as 00B, data S2 may be expressed as 01B, data S3 may be expressed as 10B, and data S4 may be expressed as 11B, wherein B indicates binary numeral. Hence, the first to third stage cyclic circuits 1001 to 1003 cycles 2-bit data relating to an order of precedence. The first to third stage cyclic circuits 1001 to 1003 operates in the same manner as the first to third stage cyclic circuits 301 to 303 in the shuffler 201*a* in accordance with the first embodiment, illustrated in FIG. 6, except that the first to third stage cyclic circuits 1001 to 1003 cycles 2-bit data relating to an order of precedence.

Hence, the third stage cyclic circuit 1003 outputs shuffled 2-bit data relating to an order of precedence from the first to fourth order output terminals. Specifically, shuffled data relating to an order of precedence transmitted from the first order output terminal of the third stage cyclic circuit 1003 is supplied to the first selector 1004 through a selector terminal thereof, shuffled data relating to an order of precedence transmitted from the second order output terminal of the third stage cyclic circuit 1003 is supplied to the second selector 1005 through a selector terminal thereof, shuffled data relating to an order of precedence transmitted from the third order output terminal of the third stage cyclic circuit 1003 is supplied to the third selector 1006 through a selector terminal thereof, and shuffled data relating to an order of precedence transmitted from the fourth order output terminal of the third stage cyclic circuit 1003 is supplied to the fourth selector 1007 through a selector terminal thereof.

Each of the first to fourth selectors 1004 to 1007 receives the requests REQ#1 to REQ#4 through the first to fourth order input terminals. The first to fourth selectors 1004 to 1007 transmit the shuffled requests SHFLREQ#1 to SHFL-REQ#4 through an output terminal, respectively.

The shuffler 201*d* in accordance with the fourth embodiment provides not only the same advantages as the advantages provided by the shuffler 201*a* in accordance with the first embodiment, but also the following additional advantage.

In the shuffler 201*a* in accordance with the first embodiment, the shuffled requests SHFLREQ#1 to SHFLREQ#4 are output with a delay caused by three cyclic circuits, after the requests REQ#1 to REQ#4 have been input to the shuffler 201*a*. In contrast, in the shuffler 201*d* in accordance with the fourth embodiment, the shuffled requests SHFL-REQ#1 to SHFLREQ#4 are output with a delay caused by one selector, after the requests REQ#1 to REQ#4 have been input to the shuffler 201*d*. Thus, the shuffler 201*d* in accordance with the fourth embodiment can shorten a delay after the requests REQ#1 to REQ#4 have been input to the shuffler 201*d* until the shuffled requests SHFLREQ#1 to SHFLREQ#4 are output from the shuffler 201*d*.

A re-shuffler associated with the shuffler 201*d* in accordance with the fourth embodiment may be accomplished by adding first to fourth selectors to the re-shuffler 203*a* illustrated in FIG. 7, supplying the above-mentioned data S1 to S4 to the first stage cyclic circuit 401, supplying an output signal transmitted from the first stage cyclic circuit 401 through the first order output terminal D11, to the first selector at a selector terminal thereof, supplying an output signal transmitted from the second stage cyclic circuit 402 through the first order output terminal D21, to the second selector at a selector terminal thereof, supplying an output signal transmitted from the third stage cyclic circuit 403 through the first order output terminal D31, to the third selector at a selector terminal thereof, supplying an output signal transmitted from the third stage cyclic circuit 403 through the second order output terminal D32, to the fourth selector at a selector terminal thereof, and supplying the shuffled grants SHFLREQ#1 to SHFLREQ#4 to input terminals of the first to fourth selectors, respectively.

Fifth Embodiment

Figure 14:
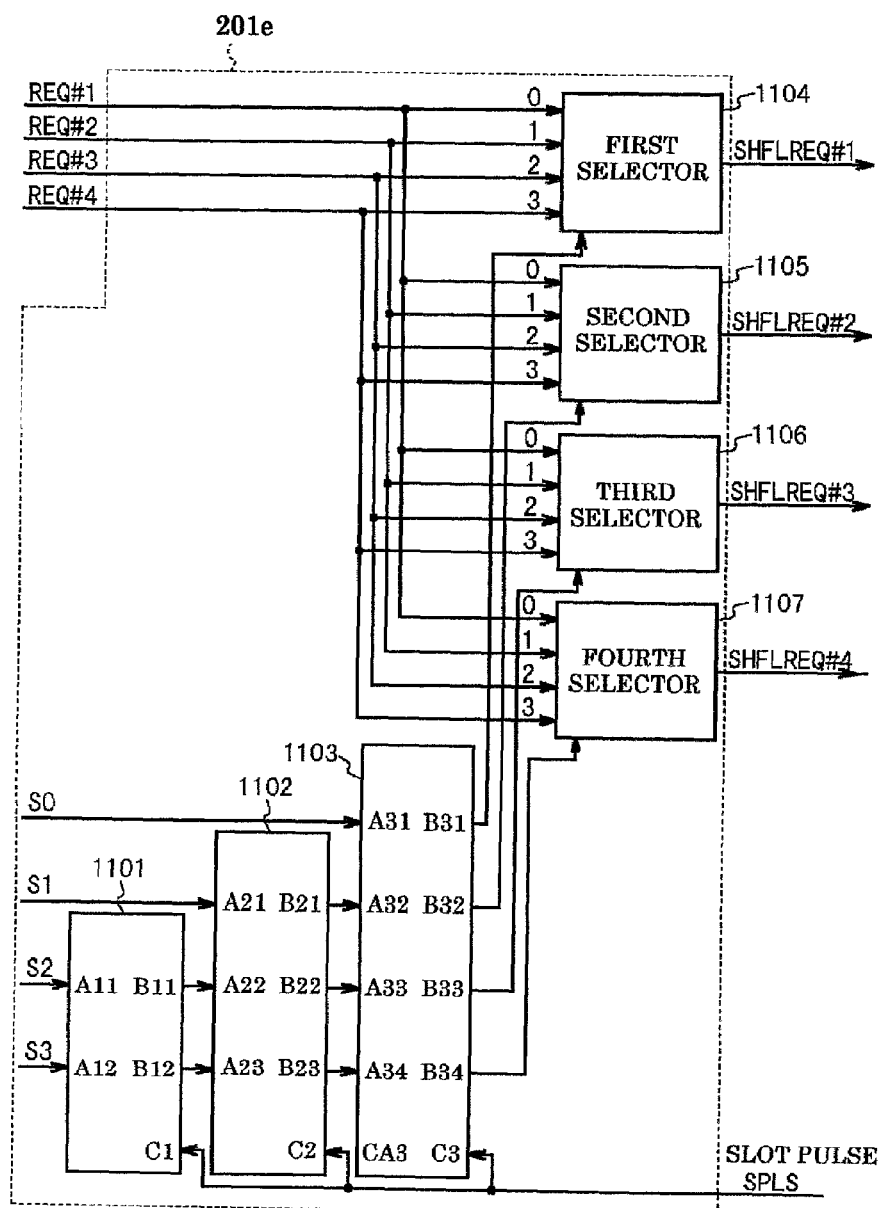
FIG. 14 is a block diagram of a shuffler in accordance with the fifth embodiment.

FIG. 14 is a block diagram of a shuffler 201*e* in accordance with the fifth embodiment.

The shuffler 201*e* is comprised of a first stage cyclic circuit 1101, a second stage cyclic circuit 1102, a third stage cyclic circuit 1103, a first selector 1104, a second selector 1105, a third selector 1106, and a fourth selector 1107.

The first to third stage cyclic circuits 1101 to 1103 are designed to have the same structure as the structures of the first to third stage cyclic circuits 1001 to 1003 in the shuffler 201*d* in accordance with the fourth embodiment, respectively, and the first to fourth selectors 1104 to 1107 are designed to have the same structure as the structures of the first to fourth selectors 1104 to 1107 in the shuffler 201*d* in accordance with the fourth embodiment, respectively.

The shuffler 201*e* in accordance with the fifth embodiment is structurally different from the shuffler 201*d* in accordance with the fourth embodiment in that a slot pulse SPLS is input into each of the cyclic terminals of the first to third stage cyclic circuits 1101 to 1103.

The shuffler 201*e* in accordance with the fifth embodiment can be obtained by replacing the first to third stage cyclic circuits 1001 to 1003 in the shuffler 201*d* with the first to third stage cyclic circuits 501 to 503 in the shuffler 201*b* illustrated in FIG. 9. Accordingly, the shuffler 201*e* in accordance with the fifth embodiment provides the same advantages as a combination of the advantages obtained by the shuffler 201*d* in accordance with the fourth embodiment and the advantages obtained by the shuffler 201*b* in accordance with the second embodiment.

A re-shuffler associated with the shuffler 201*e* in accordance with the fifth embodiment may be accomplished by adding first to fourth selectors to the re-shuffler 203*b* illustrated in FIG. 10, supplying the above-mentioned data S1 to S4 to the first stage cyclic circuit 601, supplying an output signal transmitted from the first stage cyclic circuit 601 through the first order output terminal D11, to the first selector at a selector terminal thereof, supplying an output signal transmitted from the second stage cyclic circuit 602 through the first order output terminal D21, to the second selector at a selector terminal thereof, supplying an output signal transmitted from the third stage cyclic circuit 603 through the first order output terminal D31, to the third selector at a selector terminal thereof, supplying an output signal transmitted from the third stage cyclic circuit 603 through the second order output terminal D32, to the fourth selector at a selector terminal thereof, and supplying the shuffled grants SHFLREQ#1 to SHFLREQ#4 to input terminals of the first to fourth selectors, respectively.

Sixth Embodiment

Figure 15:
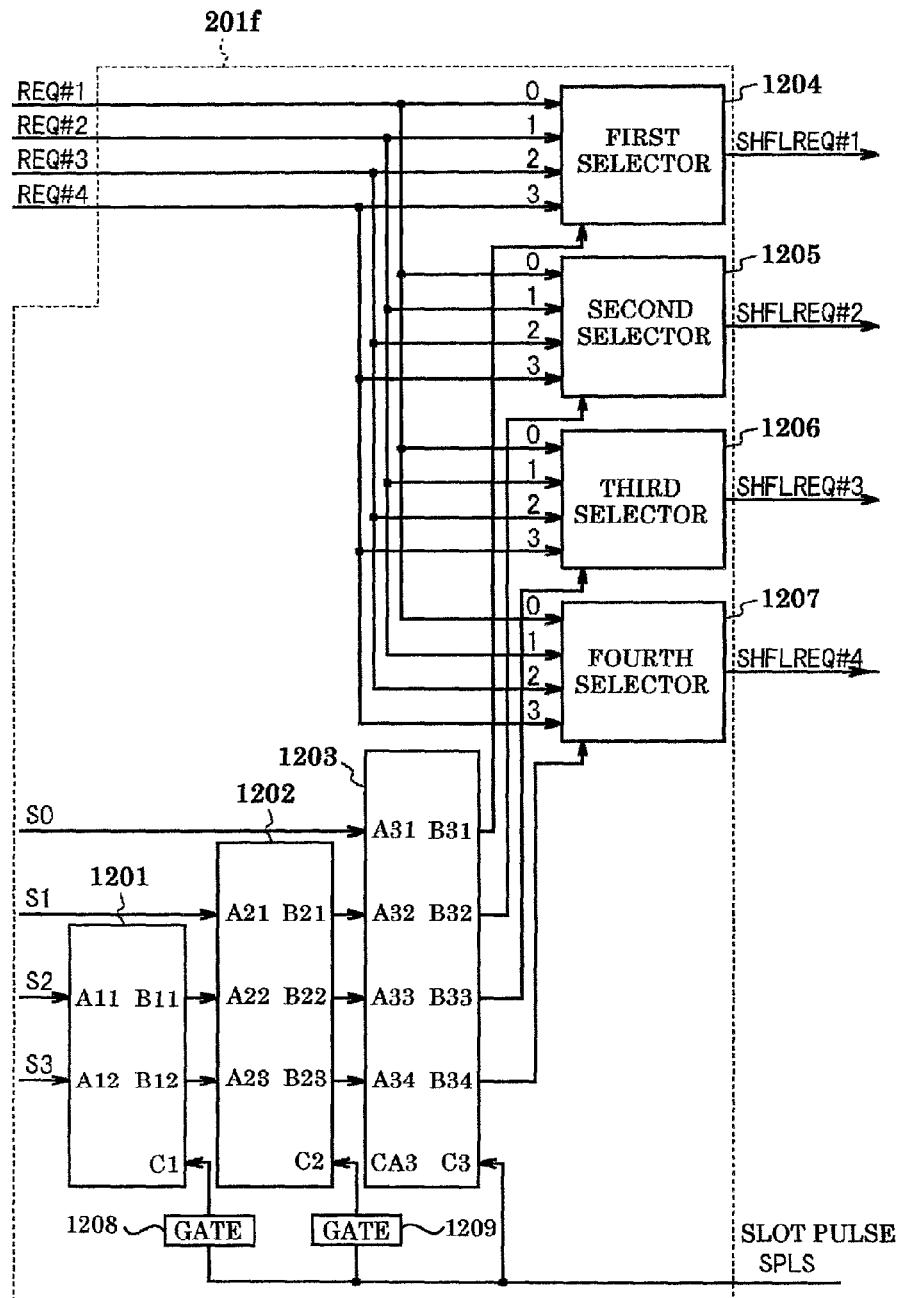
FIG. 15 is a block diagram of a shuffler in accordance with the sixth embodiment.

FIG. 15 is a block diagram of a shuffler 201*f* in accordance with the sixth embodiment.

The shuffler 201*f* is comprised of a first stage cyclic circuit 1201, a second stage cyclic circuit 1202, a third stage cyclic circuit 1203, a first selector 1204, a second selector 1205, a third selector 1206, a fourth selector 1207, a first gate 1208, and a second gate 1209.

The first to third stage cyclic circuits 1201 to 1203 are designed to have the same structure as the structures of the first to third stage cyclic circuits 1001 to 1003 in the shuffler 201*d* in accordance with the fourth embodiment, respectively, and the first to fourth selectors 1204 to 1207 are designed to have the same structure as the structures of the first to fourth selectors 1104 to 1107 in the shuffler 201*d* in accordance with the fourth embodiment, respectively. The first and second gates 1208 and 1209 have the same structures as the structures of the first and second gates 904 and 905 illustrated in FIG. 12, respectively.

The shuffler 201*f* in accordance with the sixth embodiment is structurally different from the shuffler 201*d* in accordance with the fourth embodiment in that a slot pulse SPLS is input directly into the cyclic terminal of the third stage cyclic circuit 1003, and input into each of the cyclic terminals of the first and second stage cyclic circuits 1101 and 1102 through the first and second gates 1208 and 1209, respectively.

The shuffler 201*f* in accordance with the sixth embodiment can be obtained by replacing the first to third stage cyclic circuits 1001 to 1003 in the shuffler 201*d* with the first to third stage cyclic circuits 901 to 903 together with the first and second gates 904 and 905 in the shuffler 201*c* illustrated in FIG. 12. Accordingly, the shuffler 201*f* in accordance with the sixth embodiment provides the same advantages as a combination of the advantages obtained by the shuffler 201*d* in accordance with the fourth embodiment and the advantages obtained by the shuffler 201*c* in accordance with the third embodiment.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-055249 filed on Mar. 1, 2000 including specification, claims, drawings and summary is incorporated herein by reference in its entirety.

What is claimed is:

1. A packet switch comprising:
   (a) at least one input into which a packet is input;
   (b) a switch which receives said packet from said input and switches an output through which said packet is transmitted; and
   (c) a scheduler which controls said switch,
   said scheduler comprising:
   (c1) a shuffler which shuffles an order of precedence in a first request transmitted from said input to transfer said packet;
   (c2) a schedule algorithm which determines said output, based on said first request having said order of precedence having been shuffled by said shuffler, and produces a second request to transfer a packet which second request is associated with said first request having said order of precedence having been shuffled by said shuffler;
   (c3) a re-shuffler which turns an order of precedence of said second request to be identical with said order of precedence in said first request as found before having been shuffled by said shuffler, and returns the thus turned order of precedence back to said input, and
   wherein said packet is a non-segmented packet,
   wherein said input has N input port(s) wherein N is an integer equal to or greater than 1, and wherein said shuffler shuffles an order of precedence in N request(s) to transfer a packet, transmitted through said N input port(s), so as to define N! patterns of an order of precedence,
   wherein said shuffler includes a plurality of cyclic circuits in which a request to transfer a packet, transmitted through said N input ports, is initially set, and
   wherein a cyclic circuit or cyclic circuits other than a final stage cyclic circuit cycles both (a) said initially set request, and (b) a request to transfer a packet, set by the previous stage cyclic circuit, in synchronization with a carry signal transmitted from the next stage cyclic circuit, and transmits said requests to said next stage cyclic circuit, and
   a final stage cyclic circuit cycles both (a) said initially set request and (b) a request to transfer a packet, set by the previous stage cyclic circuit, in synchronization with a slot pulse generated in a predetermined cycle.

2. The packet switch as set forth in claim 1, wherein said re-shuffler includes a plurality of cyclic circuits in which a request to transfer a packet, transmitted from scheduling algorithm, is initially set, and wherein
   a first stage cyclic circuit cycles said initially set request in synchronization with a slot pulse generated in a predetermined cycle; and
   a cyclic circuit or cyclic circuits other than said first stage cyclic circuit cycles both (a) said initially set request, and (b) a request to transfer a packet, set by the previous stage cyclic circuit, in synchronization with a carry signal transmitted from the next stage cyclic circuit, and transmits said requests to said next stage cyclic circuit.

3. The packet switch as set forth in claim 2, wherein each of said cyclic circuits is comprised of a ring shift register.

4. The packet switch as set forth in claim 1, wherein each of said cyclic circuits is comprised of a ring shift register.

5. A packet switch comprising:
   (a) at least one input into which a packet is input;
   (b) a switch which receives said packet from said input and switches an output through which said packet is transmitted; and
   (c) a scheduler which controls said switch,
   said scheduler comprising:
   (c1) a shuffler which shuffles an order of precedence in a first request transmitted from said input to transfer said packet;
   (c2) a schedule algorithm which determines said output, based on said first request having said order of precedence having been shuffled by said shuffler, and produces a second request to transfer a packet which second request is associated with said first request having said order of precedence having been shuffled by said shuffler;
   (c3) a re-shuffler which turns an order of precedence of said second request to be identical with said order of precedence in said first request as found before having been shuffled by said shuffler, and returns the thus turned order of precedence back to said input, and
   wherein said packet is a non-segmented packet,
   wherein said input has N input port(s) wherein N is an integer equal to or greater than 1, and wherein said shuffler shuffles an order of precedence in N request(s) to transfer a packet, transmitted through said N input port(s), so as to define M patterns of an order of precedence wherein M is a least common multiple of N, N−1, N−2, - - -, 3, 2, wherein said shuffler includes a plurality of cyclic circuits in which a request to transfer a packet, transmitted through said N input ports, is initially set, and wherein a cyclic circuit or cyclic circuits other than a final stage cyclic circuit cycles both (a) said initially set request, and (b) a request to transfer a packet, set by the previous stage cyclic circuit, in synchronization with a slot pulse generated in a predetermined cycle, and transmits said requests to said next stage cyclic circuit, and a final stage cyclic circuit cycles both (a) said initially set request and (b) a request to transfer a packet, set by the previous stage cyclic circuit, in synchronization with said slot pulse.

6. The packet switch as set forth in claim 5, wherein said re-shuffler includes a plurality of cyclic circuits in which a request to transfer a packet, transmitted from scheduling algorithm, is initially set, and wherein a first stage cyclic circuit cycles said initially set request in synchronization with a slot pulse generated in a predetermined cycle; and a cyclic circuit or cyclic circuits other than said first stage cyclic circuit cycles both (a) said initially set request, and (b) a request to transfer a packet, set by the previous stage cyclic circuit, in synchronization with said slot pulse, and transmits said requests to said next stage cyclic circuit.

7. The packet switch as set forth in claim 6, wherein each of said cyclic circuits is comprised of a ring shift register.

8. The packet switch as set forth in claim 5, wherein each of said cyclic circuits is comprised of a ring shift register.

9. A packet switch comprising:
(a) at least one input into which a packet is input;
(b) a switch which receives said packet from said input and switches an output through which said packet is transmitted; and
(c) a scheduler which controls said switch,
said scheduler comprising:
(c1) a shuffler which shuffles an order of precedence in a first request transmitted from said input to transfer said packet;
(c2) a schedule algorithm which determines said output, based on said first request having said order of precedence having been shuffled by said shuffler, and produces a second request to transfer a packet which second request is associated with said first request having said order of precedence having been shuffled by said shuffler;
(c3) a re-shuffler which turns an order of precedence of said second request to be identical with said order of precedence in said first request as found before having been shuffled by said shuffler, and returns the thus turned order of precedence back to said input, and wherein said packet is a non-segmented packet,
wherein said input has N input port(s) wherein N is an integer equal to or greater than 1, and wherein said shuffler shuffles an order of precedence in N request(s) to transfer a packet, transmitted through said N input port(s), so as to define first M patterns of an order of precedence, and then, further define second M patterns of an order of precedence, wherein M is a least common multiple of N, N−1, N−2, - - - , 3, 2.

10. The packet switch as set forth in claim 9, wherein said shuffler includes a plurality of cyclic circuits in which a request to transfer a packet, transmitted through said N input ports, is initially set, and wherein a cyclic circuit or cyclic circuits other than a final stage cyclic circuit includes a gate circuit which is closed at a predetermined timing, and cycles both (a) said initially set request, and (b) a request to transfer a packet, set by the previous stage cyclic circuit, in synchronization with a slot pulse transmitted through said gate circuit in a predetermined cycle, and transmits said requests to said next stage cyclic circuit, and a final stage cyclic circuit cycles both (a) said initially set request and (b) a request to transfer a packet, set by the previous stage cyclic circuit, in synchronization with said slot pulse.

11. The packet switch as set forth in claim 10, wherein said re-shuffler includes a plurality of cyclic circuits in which a request to transfer a packet, transmitted from scheduling algorithm, is initially set, and wherein a first stage cyclic circuit cycles said initially set request in synchronization with a slot pulse generated in a predetermined cycle; and a cyclic circuit or cyclic circuits other than said first stage cyclic circuit includes a gate circuit which is closed at a predetermined timing, and cycles both (a) said initially set request, and (b) a request to transfer a packet, set by the previous stage cyclic circuit, in synchronization with said slot pulse, and transmits said requests to said next stage cyclic circuit.

12. The packet switch as set forth in claim 11, wherein each of said cyclic circuits is comprised of a ring shift register.

13. The packet switch as set forth in claim 10, wherein each of said cyclic circuits is comprised of a ring shift register.

14. The packet switch as set forth in claim 9, wherein said shuffler includes:
(a) a plurality of cyclic circuits in which precedence data indicative of N orders of precedence is initially set; and
(b) N selectors each of which selects one of said N requests in response to an output transmitted from a final stage cyclic circuit, a cyclic circuit or cyclic circuits other than a final stage cyclic circuit includes a gate circuit which is closed at a predetermined timing, and cycles both (a) said initially set precedence data, and (b) precedence data set by the previous stage cyclic circuit in synchronization with a slot pulse transmitted through said gate circuit in a predetermined cycle, and transmits those precedence data to said next stage cyclic circuit, and a final stage cyclic circuit cycles both (a) said initially set precedence data and (b) precedence data set by the previous stage cyclic circuit in synchronization with said slot pulse.

15. A packet switch, comprising:
(a) at least one input into which a packet is input;
(b) a switch which receives said packet from said input and switches an output through which said packet is transmitted; and
(c) a scheduler which controls said switch, said scheduler comprising:
(c1) a shuffler which shuffles an order of precedence in a first request transmitted from said input to transfer said packet;
(c2) a schedule algorithm which determines said output, based on said first request having said order of precedence having been shuffled by said shuffler, and produces a second request to transfer a packet which second request is associated with said first request having said order of precedence having been shuffled by said shuffler;

(c3) a re-shuffler which turns an order of precedence of said second request to be identical with said order of precedence in said first request as found before having been shuffled by said shuffler, and returns the thus turned order of precedence back to said input, and wherein said packet is a non-segmented packet, said input has N input port(s) wherein N is an integer equal to or greater than 1, and wherein said shuffler shuffles an order of precedence in N request(s) to transfer a packet, transmitted through said N input port(s), so as to define N! patterns of an order of precedence, said shuffler comprising:

a plurality of cyclic circuits in which precedence data indicative of N orders of precedence is initially set; and N selectors each of which selects one of said N requests in response to an output transmitted from a final stage cyclic circuit, a cyclic circuit or cyclic circuits other than a final stage cyclic circuit cycles both (a) said initially set precedence data and (b) precedence data set by the previous stage cyclic circuit in synchronization with a carry signal transmitted from the next stage cyclic circuit, and transmits those precedence data to said next stage cyclic circuit, and a final stage cyclic circuit cycles both (a) said initially set precedence data and (b) said precedence data set by the previous stage cyclic circuit in synchronization with a slot pulse generated in a predetermined cycle, and supplies those precedence data to said N selectors.

16. The packet switch as set forth in claim 15, wherein each of said cyclic circuits is comprised of a ring shift register.

17. A packet switch, comprising:

(a) at least one input into which a packet is input;

(b) a switch which receives said packet from said input and switches an output through which said packet is transmitted; and (c) a scheduler which controls said switch, said scheduler comprising:

(c1) a shuffler which shuffles an order of precedence in a first request transmitted from said input to transfer said packet;

(c2) a schedule algorithm which determines said output, based on said first request having said order of precedence having been shuffled by said shuffler, and produces a second request to transfer a packet which second request is associated with said first request having said order of precedence having been shuffled by said shuffler:

(c3) a re-shuffler which turns an order of precedence of said second request to be identical with said order of precedence in said first request as found before having been shuffled by said shuffler, and returns the thus turned order of precedence back to said input, and wherein said packet is a non-segmented packet, said input has N input port(s) wherein N is an integer equal to or greater than 1, and wherein said shuffler shuffles an order of precedence in N request(s) to transfer a packet, transmitted through said N input port(s), so as to define M patterns of an order of precedence wherein M is a least common multiple of N, N–1, N–2, - - - , 3, 2, said shuffler comprising:

a plurality of cyclic circuits in which precedence data indicative of N orders of precedence is initially set; and N selectors each of which selects one of said N requests in response to an output transmitted from a final stage cyclic circuit, a cyclic circuit or cyclic circuits other than a final stage cyclic circuit cycles both (a) said initially set precedence data and (b) precedence data set by the previous stage cyclic circuit in synchronization with a slot pulse generated in a predetermined cycle, and transmits those precedence data to said next stage cyclic circuit, and a final stage cyclic circuit cycles both (a) said initially set precedence data and (b) said precedence data set by the previous stage cyclic circuit in synchronization with said slot pulse, and supplies those precedence data to said N selectors.

18. The packet switch as set forth in claim 17, wherein each of said cyclic circuits is comprised of a ring shift register.

* * * * *